US011155361B2

(12) United States Patent
Conaway

(10) Patent No.: US 11,155,361 B2
(45) Date of Patent: *Oct. 26, 2021

(54) METHODS AND SYSTEMS FOR A GRAPHICAL USER INTERFACE OF AN ELECTRONIC AVIATION CHECKLIST

(71) Applicant: Honeywell International Inc., Morris Plains, NJ (US)

(72) Inventor: Cody Ryan Conaway, Phoenix, AZ (US)

(73) Assignee: Honeywell International Inc., Charlotte, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 16/875,469

(22) Filed: May 15, 2020

(65) Prior Publication Data
US 2020/0277083 A1 Sep. 3, 2020

Related U.S. Application Data

(63) Continuation of application No. 16/298,622, filed on Mar. 11, 2019, now Pat. No. 10,689,128.
(Continued)

(51) Int. Cl.
*B64D 45/00* (2006.01)
*G06F 3/0482* (2013.01)

(52) U.S. Cl.
CPC ........... *B64D 45/00* (2013.01); *G06F 3/0482* (2013.01)

(58) Field of Classification Search
CPC .............................. B64D 45/00; G06F 3/0482
(Continued)

(56) References Cited

U.S. PATENT DOCUMENTS 5,454,074 A 9/1995 Hartel et al.
6,753,891 B1 6/2004 Chohan et al.
(Continued)

FOREIGN PATENT DOCUMENTS

WO 2018087745 A1 5/2018

OTHER PUBLICATIONS

Extended European Search Report dated Mar. 5, 2020, issued in corresponding European Patent Application No. 19204211.7 (9 pages).
(Continued)

*Primary Examiner* — Kerri L McNally
(74) *Attorney, Agent, or Firm* — Bookoff McAndrews, PLLC

(57) ABSTRACT

Disclosed are methods, systems, and non-transitory computer-readable medium for updating a graphic user interface (GUI) of a vehicle. For instance, the method may include generating and displaying a checklist GUI with a plurality of tasks on a display; determining whether information indicating that a task of the plurality of tasks has been completed has been received; in response to determining that the information indicating that the task has been completed has been received, determining whether a user or a system indicated that the task is complete; in response to determining that the user indicated that the task is complete, updating the checklist GUI to change a status indicator of the task to a first type of status indicator; and in response to determining that the system indicated that the task is complete, updating the checklist GUI to change the status indicator of the task to a second type of status indicator.

20 Claims, 24 Drawing Sheets

Related U.S. Application Data

(60) Provisional application No. 62/749,497, filed on Oct. 23, 2018.

(58) Field of Classification Search
USPC .......................................................... 340/971
See application file for complete search history.

(56) References Cited

U.S. PATENT DOCUMENTS

| | | | |
|---|---|---|---|
| 8,527,871 B2 | 9/2013 | Holder et al. | |
| 8,736,464 B1 * | 5/2014 | Downs Mullen | G01C 23/00 340/945 |
| 10,689,128 B2 * | 6/2020 | Conaway | B64D 43/00 |
| 2013/0138467 A1 | 5/2013 | Small et al. | |
| 2017/0275018 A1 * | 9/2017 | Narra | B64D 45/00 |
| 2017/0291723 A1 * | 10/2017 | Reddy | B64D 45/00 |
| 2018/0292953 A1 * | 10/2018 | Pandya | B64D 43/00 |

OTHER PUBLICATIONS

Barbara E. Holder; "Improving the Boeing Quick Reference Handbook," available at: https://human-factors.arc.nasa.gov/flightcognition/download/EAS_Symposium_Presentations/Boeing_QRH.pdf, retrieved Oct. 15, 2018, and presented Jun. 10, 2003 (27 pages).

* cited by examiner

COMPLETION STATUSES

1700

| STATUS | INDICATOR | |
|---|---|---|
| INCOMPLETE | ○ | EMPTY SPACE BACKGROUND, NO FILL |
| 1/6 COMPLETE (~10%) | ◔ | LINE∠θ'S=45° |
| 1/4 COMPLETE (25%) | ◔ | LINE∠θ'S=90° |
| 1/3 COMPLETE (~33%) | ◔ | LINE∠θ'S=135° |
| 1/2 COMPLETE (50%) | ◐ | LINE∠θ'S=180° |
| 2/3 COMPLETE (~66%) | ◕ | LINE∠θ'S=225° |
| 3/4 COMPLETE (75%) | ◕ | LINE∠θ'S=270° |
| 5/6 COMPLETE (~90%) | ◕ | LINE∠θ'S=315° |
| SYSTEM COMPLETED (CLOSED LOOP, 100%) | ● | SOLID FILL |
| CREW COMPLETED CHECKMARK | ✓ | |
| CREW TASK OVERRIDE "X" | ⊗ | EMPTY SPACE BACKGROUND, NO FILL |

Lines 1/6 through 5/6 bracketed as: SYSTEM OR CREW PROGRESS OF CHECKLISTS

*FIG. 17*

METHODS AND SYSTEMS FOR A GRAPHICAL USER INTERFACE OF AN ELECTRONIC AVIATION CHECKLIST

CROSS-REFERENCE TO RELATED APPLICATIONS

This application is a continuation of and claims the benefit of priority to U.S. patent application Ser. No. 16/298,622, filed on Mar. 11, 2019, which claims the benefit of priority to U.S. Provisional Application No. 62/749,497, filed Oct. 23, 2018, which is incorporated herein by reference in its entirety, and this application is related to co-pending U.S. Design Patent Application No. 29/669,166, entitled "DISPLAY SCREEN WITH GRAPHICAL USER INTERFACE", and U.S. Design Patent Application No. 29/669,183, entitled "DISPLAY SCREEN WITH GRAPHICAL USER INTERFACE", which were both filed on Nov. 6, 2018, and are incorporated by reference in their entirety.

TECHNICAL FIELD

Various embodiments of the present disclosure relate generally to checklists and, more particularly, to methods and systems for a graphical user interface (GUI) of an electronic aviation checklist.

BACKGROUND

Aircraft checklists have traditionally been executed via paper medium. Moreover, in recent years, aircraft checklist have been operated from a tablet (e.g., ForeFlight) using a checklist application related to flight management, a proprietary-interactive PDF (e.g., Gulfstream Planebook), or Original Equipment Manufacturers (OEM) applications on a flight deck (e.g. Boeing). Honeywell currently offers an Electronic Checklists (ECL) system with basic functionality, while other suppliers have flight deck systems which display checklists using simple automation for specific tasks. Boeing is one example of an OEM which has made efforts to improve crew performance of their ECL system and Quick Reference Handbook (QRH)/Aircraft Flight Manual (AFM) by developing rules for writing and designing checklists, but these improvements primarily exist in print media. Overall, existing ECL's offer very little performance advantage to crews and are basically an electronic form of a paper checklist. Areas observed as not adequately addressed in ECL's include: basic usability principles and menu structure design, interaction design, content design and typography, crew error reduction, and performance enhancements.

The present disclosure is directed to overcoming one or more of these above-referenced challenges.

SUMMARY OF THE DISCLOSURE

According to certain aspects of the disclosure, systems and methods are disclosed for updating a graphic user interface (GUI) of a vehicle.

For instance, a method may include generating and displaying a checklist GUI with tasks on a display; determining whether information indicating that a task among the tasks has been completed has been received; in response to determining that the information indicating that the task has been completed has been received, determining whether a user or a system indicated that the task is complete; in response to determining that the user indicated that the task is complete, updating the checklist GUI to change a status indicator of the task to a first type of status indicator; and in response to determining that the system indicated that the task is complete, updating the checklist GUI to change the status indicator of the task to a second type of status indicator.

A system may include a display; a memory storing instructions; and a processor executing the instructions to perform a process. The process may include: generating and displaying a checklist GUI with tasks on the display; determining whether information indicating that a task among the tasks has been completed has been received; in response to determining that the information indicating that the task has been completed has been received, determining whether a user or a system indicated that the task is complete; in response to determining that the user indicated that the task is complete, updating the checklist GUI to change a status indicator of the task to a first type of status indicator; and in response to determining that the system indicated that the task is complete, updating the checklist GUI to change the status indicator of the task to a second type of status indicator.

A non-transitory computer-readable medium may store instructions that, when executed by a processor, cause the processor to perform a method. The method may include: generating and displaying a checklist GUI with tasks on a display; determining whether information indicating that a task among the tasks has been completed has been received; in response to determining that the information indicating that the task has been completed has been received, determining whether a user or a system indicated that the task is complete; in response to determining that the user indicated that the task is complete, updating the checklist GUI to change a status indicator of the task to a first type of status indicator; and in response to determining that the system indicated that the task is complete, updating the checklist GUI to change the status indicator of the task to a second type of status indicator.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 17 depicts completion statuses for a GUI for a checklist, according to one or more embodiments.

DETAILED DESCRIPTION OF EMBODIMENTS

Figure 1:
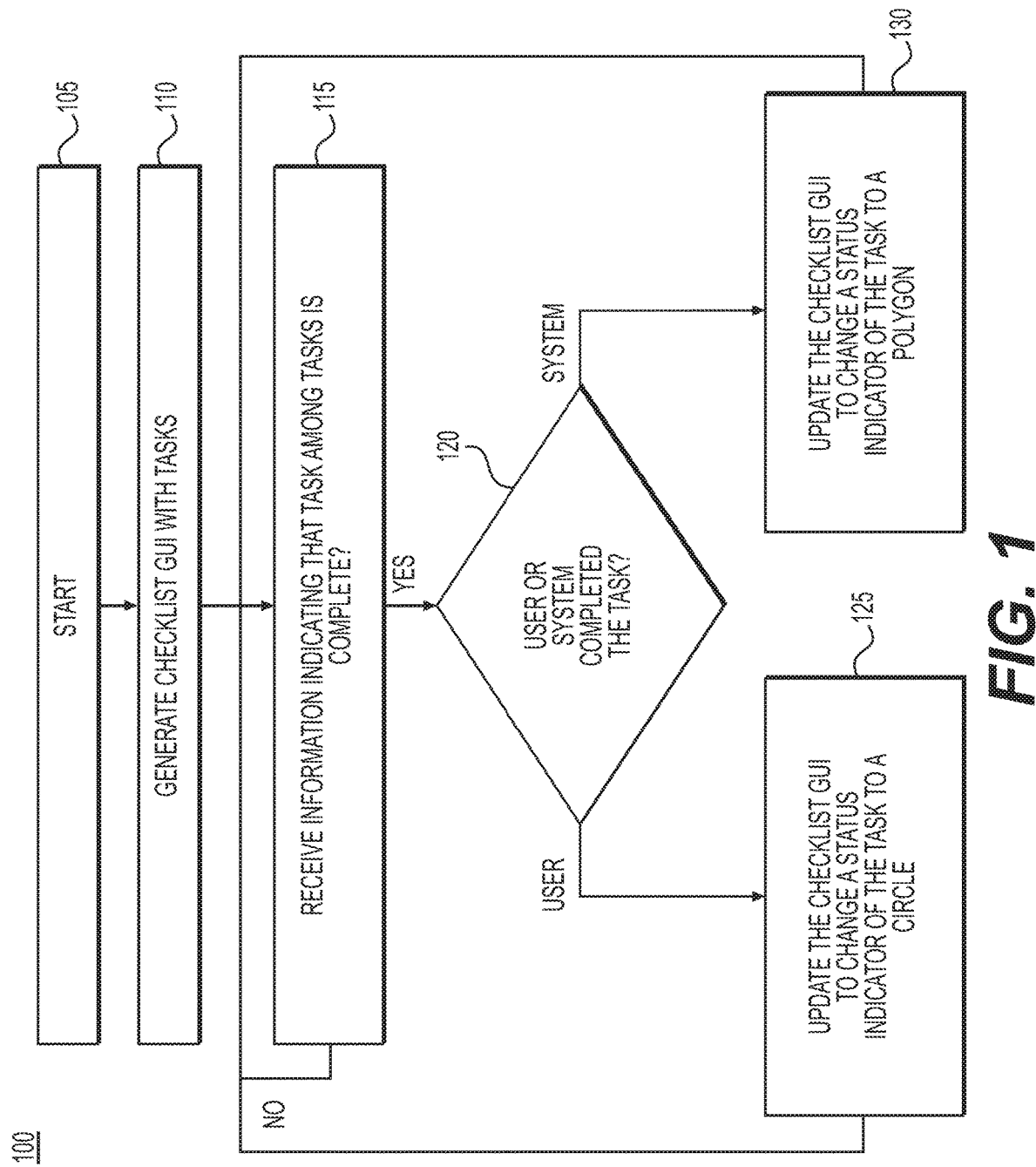
FIG. 1 depicts a flowchart for updating a checklist, according to one or more embodiments.

Various embodiments of the present disclosure relate generally to checklists and, more particularly, to methods and systems for a GUI of an electronic aviation checklist.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value.

The term "exemplary" is used in the sense of "example" rather than "ideal." As used herein, the singular forms "a," "an," and "the" include plural reference unless the context dictates otherwise.

While this disclosure describes the systems and methods with reference to a GUI for an aviation checklist, it should be appreciated that the present systems and methods are applicable to GUIs for checklists generally and checklists for vehicles including those of drones, automobiles, ships, or any other autonomous and/or Internet-connected vehicle.

In general, the present disclosure is directed to GUIs for checklists for vehicles, and specifically for GUIs for aviation checklists. As will be discussed below, a system may generate and display GUIs on a display that include checklists that have tasks to be completed by a user. The system may display the checklists and the tasks in manner that may improve user performance by a consistent graphical structure, symbology, and content display, thereby increasing usability. Moreover, the system may display checklists that may allow the user to link to sub-checklists thereby increasing user performance while also providing indicators with different associated meanings (e.g., user completed, skipped, ignored, incomplete, system completed, partially completed, etc.) so that the user may understand the status of each task of a checklist. Furthermore, an Abnormal/Emergency checklist display may make use a branching display that can inform users of tasks that may resolve the issue and provide the user with links for quick access to respective sub-checklists search. Similarly, the checklist system may provide a quick action section, a browse section, and a search section so that a user may reduce user search times for checklists. The checklist system may also automatically determine when certain tasks have been completed by a user or by the system, and may indicate associated tasks on the display as being completed using a different symbol than the tasks that have completed by a user input. Additionally, the content structure may prevent overlapping words to ensure ease of reading and interpretation, while also using performance based typography. Meanwhile, the symbology for indicators may maximize interpretation speed and reduce reaction times for procedures and tasks.

FIG. 1 depicts a flowchart for updating a checklist, according to one or more embodiments. Specifically, FIG. 1 depicts a flowchart for a checklist GUI program (comprised of instructions executable by a processor) that causes a display to display a checklist system. The processor may cause the display to display the checklist system by generating images and transmitting the images to the display to be displayed. Alternatively or additionally, the processor may generate instructions and/or information and transmit the instructions and/or information to a graphics processing unit (GPU). The GPU may then generate images to be displayed on the display. The checklist GUI program may be for an aircraft or for a vehicle. The checklist GUI program may be stored in a memory; the memory may be connected to the processor so that the processor may receive stored instructions or data, and the processor may process the instructions, stored data, received information in accordance with the checklist GUI program; the memory and the processor may be connected to the display either directly or indirectly; collectively the memory, the processor, and the display may be referred to as a "system".

The checklist system may be an interactive aviation checklist that is displayed to a pilot of an aircraft and that may be updated, searched, and modified based on a pilot's inputs and system inputs from other aircraft systems. The interactive aviation checklist may be displayed as a checklist GUI. Also, the checklist system may be an interactive vehicle checklist that is displayed to a user of vehicle (e.g., ship, drone, automobile, or train) and that may be updated, searched, and modified based on user inputs and system inputs from other vehicle systems.

A user may interact with the checklist system by one or more inputs, such as inputs to the checklist GUI. For instance, the display may be a touch screen device that may receive a user input based on a user's interaction with the display screen and/or the display may be connected to hardware buttons, a curser control device (CCD), or other standard hardware input mechanism.

The processor may receive information from the input methods discussed above or from other systems (e.g., of the aircraft or vehicle). The processor may cause the checklist system to update based on the received information. For instance, as a user progresses through the checklist system, the user may interact with the checklist system to indicate that the task is completed, ignored, or skipped, by selecting digital icons (or associated hardware buttons) for one or more of completed, ignored, or skipped, or by a user input on an associated portion of the display, as discussed for example in FIGS. 2-23. Furthermore, the processor may receive inputs from other systems of the vehicle that indicate a task is complete (e.g., a sensor on the wheels indicate that a brake is no longer active or a sensor on an engine indicates it has been started).

Moreover, the checklist GUI may include a control bar (e.g., a header or footer) and a content section. The control bar may include a core function selection menu, core quick access icons, original equipment manufacturer (OEM) configurable quick access icons, and a display control menu (which may not be applicable to traffic services communications (TSC) applications). The content section may be visually divided into four columns to aid reading and interpretation. The four columns may include a status indicator column, a challenge column, a response column, and a checklist impact notification (CIN) column, which may be spaced respectively across the display from left to right. Between the challenge and response columns may be default empty space, which is hard coded to maintain text in respective columns, prevent overlap, and ensure reading clarity. The default empty space may apply in normal and/or abnormal/emergency checklists.

Generally, specific content in the control bar and the content section may be determined by a configuration file. The configuration file may include information about checklists, tasks for each of the checklists, and relationships between checklists (e.g., parent and child checklists). The checklist GUI program may include rules to determine what is displayed for each checklist, and rules to determine what is displayed for each task of a checklist. The configuration file may be OEM modifiable, and may be organized as lists, by phase-of-flight, or some other schema. For instance, before taxing, the content section may display a first set of tasks in a list format; then between taxing and lift off, a second set of tasks; then after lift off, a third set of tasks, etc.

In FIG. 1, the checklist GUI program may start (block 105) when the vehicle or aircraft is turned on (or a part of the vehicle or aircraft is turned on, e.g., a cockpit of an aircraft); alternatively, the checklist GUI program may start based on a user input to the system to display the checklist system.

Then, the checklist GUI program may advance to block 110, generate a checklist GUI with tasks. The checklist GUI may be a user interface for the checklist system. The checklist GUI is discussed below and with respect to FIGS. 2-14. Each task may have a status symbol which indicates whether the task has been completed, ignored, skipped, incomplete, etc. The status symbol for tasks that are incomplete (which may be a default status) may an empty circle.

Then, the checklist GUI program may advance to block 115, determine whether information indicating that a task among tasks is complete has been received. If not, the checklist GUI program may return to block 115 to re-determine whether information indicating that the task among the tasks is complete after a predetermined period of time or in response to an input to the system.

If yes, the checklist GUI program may advance to block 120, determine whether a user or system indicated the task is complete. The checklist GUI program may determine that the received information indicates that a user indicated the task is completed or that the received information indicates that the system indicated that the task is completed. For instance, the received information may be a user input indicating that the task has been completed by the user (e.g., start engines). The received information may be a system signal from another system of the vehicle or aircraft indicating that the task has been completed. For instance, any user tasks which is automatically detected, analyzed, synthesized, and/or performed by the system for the crew (e.g., check whether brakes are operational by a computer program of the brake system and is reported to the system).

If the checklist GUI program determines that the user completed the task, then the checklist GUI program may advance to block 125, update the checklist GUI to change a status indicator of the task to a circle. A user completed task status indicator may be a circle with a check mark inside the circle.

If the checklist GUI program determines that the system completed the task, then the checklist GUI program may advance to block 130, update the checklist GUI to change a status indicator of the task to a polygon. A system completed task status indicator may be a polygon (e.g., diamond, square, rectangle, triangle, etc.) with a check mark inside the polygon.

In either case from block 125 or 130, the checklist GUI program may return to block 115 to determine whether information indicating a task among the tasks is complete has been received.

Figure 2:
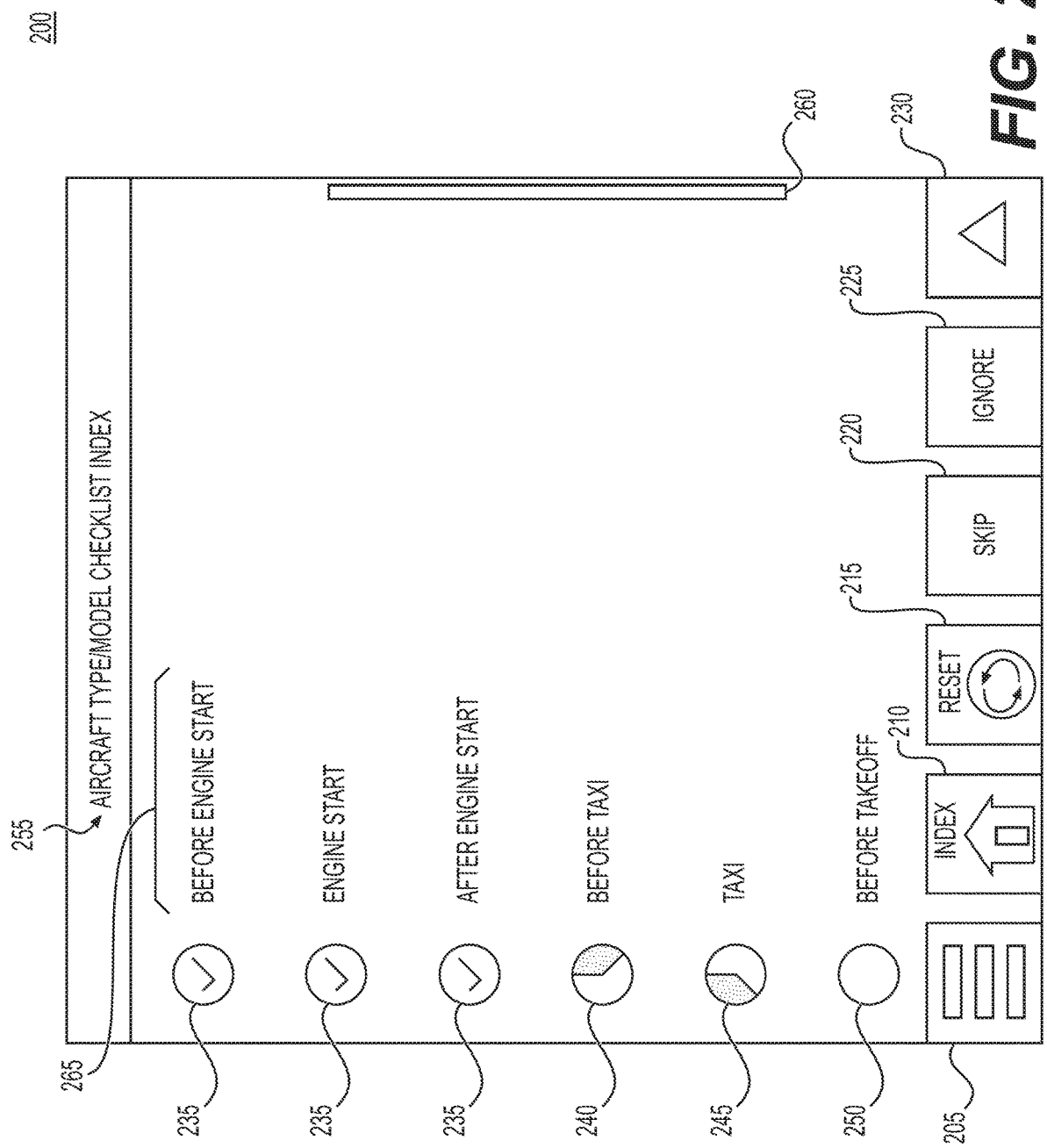
FIG. 2 depicts an exemplary GUI for a checklist, according to one or more embodiments.

FIG. 2 depicts an exemplary GUI for a checklist, according to one or more embodiments. GUI 200 may include a group of home icons (including one or more of a system function menu icon 205, a index icon 210, a reset icon 215, a skip icon 220, an ignore icon 225, a display control drop down menu icon 230), one or more completed task indicators 235, one or more partially completed task indicators 240 and 245, one or more incomplete task indicators 250, a header 255, a scroll bar indicator 260, and one or more task titles 265. A processor, as described above, may cause GUI 200 to be displayed on the display of the system.

GUI 200 may be a home menu for the checklist system. One or more tasks (a task may be an indicator associated with a task title) may represent a sub-checklist. A user may select the task, and the sub-check list corresponding to the selected task may displayed; for instance, FIG. 3 may depict an example of a sub-check list that is displayed in GUI 300. In each checklist (parent checklist), any task may represent a sub-checklist of the parent checklist (e.g., a sub-check list to a sub-checklist is a grand child to the home menu).

The group of home icons may correspond to the control bar discussed above. The group of home icons may be based on OEM Function Allocation Matrix (FAM) data.

The one or more of a system function menu icon 205 may be selected by the user by a user input. Based on the user input, the processor may cause a settings pop-up 705 to be displayed (see FIG. 7 below), which may include checklist system controls. Checklist system controls may alter the state or control of checklist content.

The index icon 210 may be selected by a user input. Based on the user input, the processor may return the display to the home menu (e.g., GUI 200) or return the display to a next level higher than what is currently displayed (e.g., if in a grand child checklist is displayed, then the processor would display the parent checklist). A currently displayed checklist may be called an active checklist.

The reset icon 215 may be selected by a user input. Based on the user input, the processor may refresh the active checklist. For instance, the processor may update the active checklist with the most recent data for each task that is mutable (e.g., a crew alert system (CAS) data).

The skip icon 220 may be selected by a user input. Based on the user input, the processor may progress to a next task in the active checklist and leave the current task with a status indicator of incomplete. For instance, this may be used when the crew intends to complete the task later.

The ignore icon 225 may be selected a user input. Based on the user input, the processor may update the status indicator of the current task from incomplete to ignored, which may be gray "X" inside a gray circle, with gray text. For instance, this may be used when the crew intends to not complete the current task.

The display control drop down menu icon 230 may be selected a user input. Based on the user input, the processor may update the current display to display a selection menu (e.g., FIG. 12, in which may be displayed a second display control drop down menu icon 230a which may return the display back to the current display).

The one or more completed task indicators 235, the one or more partially completed task indicators 240 and 245, the one or more incomplete task indicators 250, the header 255, and the scroll bar indicator 260 may correspond to the content section discussed above.

Figure 3:
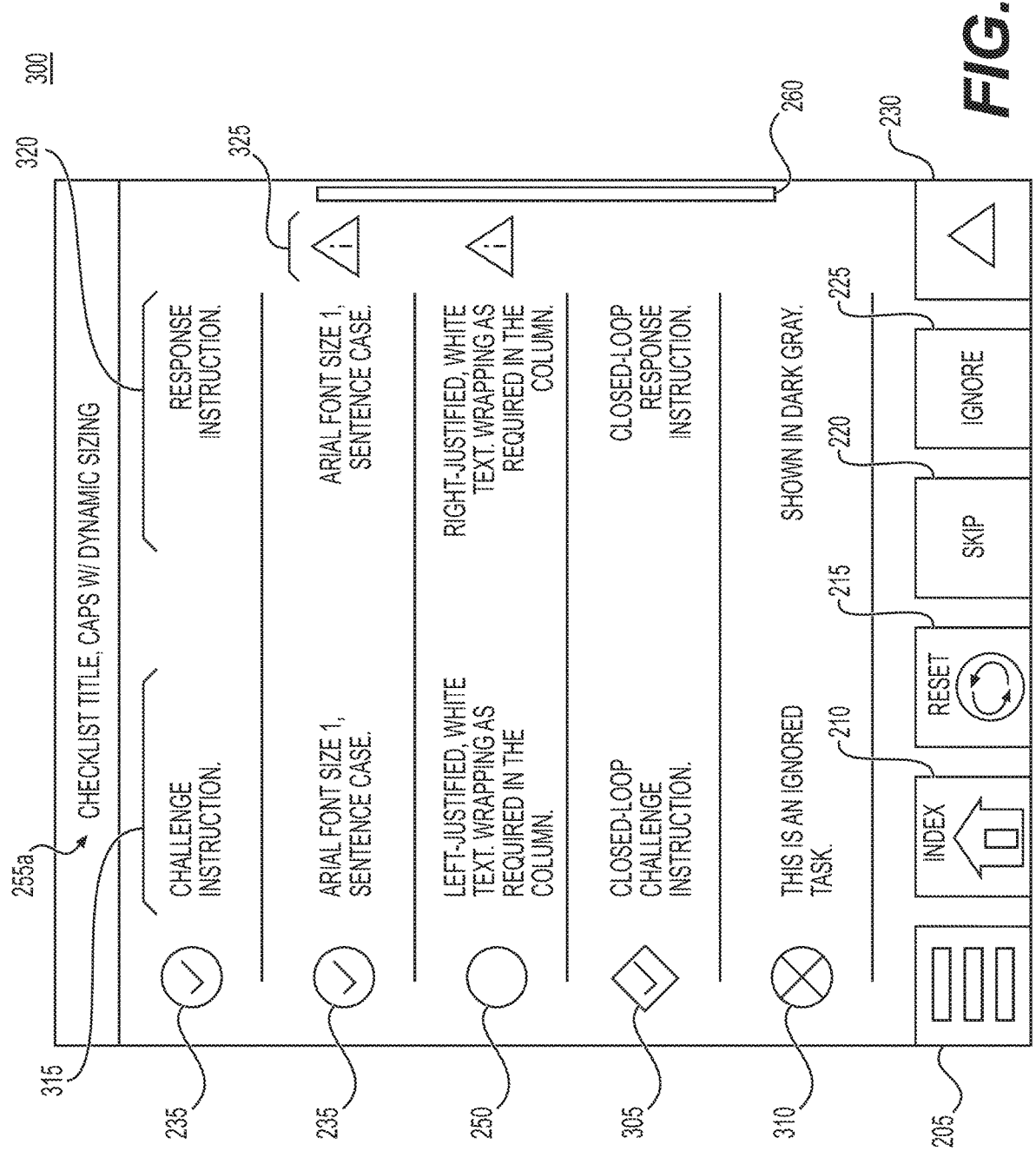
FIG. 3 depicts an exemplary GUI for a checklist, according to one or more embodiments.

As discussed above, a task may be an indicator associated with a task title 265 (or challenge and response pair, discussed below with respect to FIG. 3). The indicator may be the one of the one or more completed task indicators 235, the one or more partially completed task indicators 240 and 245, or the one or more incomplete task indicators 250 as depicted in FIG. 2, or the one or more system completed task indicators 305 or the one or more ignored task indicators 310 as depicted in FIG. 3 (collectively "indicators").

The one of the one or more completed task indicators 235 may be displayed for tasks marked complete by a user. A user may mark a task complete by a user input. The user input may be a selection of the task, thereby indicating that the task has been completed. The one of the one or more completed task indicators 235 may be displayed using a white checkmark inside of a green circle.

The one or more partially completed task indicators 240 and 245 may be displayed for tasks that have sub-checklists that are not fully complete (e.g., at least one task of the sub-checklist has not been completed). The one or more partially completed task indicators 240 and 245 may be displayed using circle with a portion filled in, like pie shape or a region of a clock between an hour hand and a second hand filled in. Specifically, the one or more partially completed task indicators 240 and 245 may be displayed using a green clock and a white outline. The green clock may be shown as either one-third (as depicted by reference 240) or two-thirds (as depicted by reference 245) complete. The processor may select which green clock to use based on a percentage of completed tasks of the sub-checklist; for instance, if more than one task but not more than a threshold percentage of tasks are complete for the sub-checklist than the one-third green clock may be selected, and if more than or equal the threshold percentage but not all of tasks are complete than the two-third green clock may be selected. The display of a green clock for a sub-checklist may serve as a visual checklist history, thereby avoiding the need for a dedicated menu. Furthermore, the display of a green clock may be a general demonstration of how much of the checklist is complete and incomplete, thereby indicating to the user how much a sub-checklist is complete/incomplete.

The one or more incomplete task indicators 250 may be displayed for tasks that are not yet completed or that have been skipped and not yet completed. The one or more incomplete task indicators 250 may be displayed using an open (e.g., empty), light gray, circle.

The one or more system completed task indicators 305 may be displayed for tasks that have been indicated as complete the system. The system may indicate a task is complete when a task is automatically detected, analyzed, synthesized, and/or performed by the system for the crew. For instance, a task may be completed by the user or the system (for the user); a task system (a vehicle or aircraft system associated with the task connected to the system) may transmit a message to the system indicating a change in status (e.g., engine on); the system may receive the message and determine the task has been completed. The one or more system completed task indicators 305 may be displayed using a white checkmark inside of a green filled polygon (e.g., diamond). The one or more system completed task indicators 305 may be associated with tasks called a Closed Loop task.

The one or more ignored task indicators 310 may be displayed for tasks that have been marked by the user to ignore, as discussed above.

Moreover, the user may over override a system completed task, when the user manually completes a Closed Loop task. The processor may then change the indicator from a system completed task indicator 305 to a completed task indicator 235.

The header 255 may be a title of a currently displayed checklist. The header 255 may change based on which checklist is currently displayed (see, e.g., reference 255a, 255b, 255c, and 255d). While the home menu is displayed, the header 255 may include a text string that includes an aircraft type (or vehicle type) with "Checklist Index."

The scroll bar indicator 260 may be a visual element which does not have clickable or touchable attributes, or alternatively, the scroll bar indicator 260 may be clickable or touchable so as to move a view position of the current checklist in the display. A view position of the current checklist may be defined as a currently displayed portion of a checklist if the checklist has an amount of tasks that would continue beyond the displayable portion of the content section in either vertical direction. A length of a checklist is determined by the amount of tasks and an amount of content associated with each of the tasks (e.g., the one or more task titles 265 of FIG. 2 or the one or more challenge instructions 315 and the one or more response instructions 320 of FIG. 3 below). The scroll bar indicator 260 may be sized, positioned, and moved by the processor to provide visual place keeping and visual estimation of content quantity, direction of content, and scrolling direction. For instance, the processor may size the scroll bar indicator 260 (e.g., in a length dimension while maintaining a constant width) inversely proportional to the length of the checklist, position the scroll bar indicator 260 proportionally to the view position of the checklist (e.g., if the view position is nearer the top of the checklist, scroll bar indicator 260 is nearer the top), and move the scroll bar indicator 260 in a same direction as the view position. The view position may be changed based on changes in indicators for the tasks (see, e.g., FIG. 9 below) or based on a user actively scrolling (see, e.g., FIG. 10 below). Furthermore, when the user is actively scrolling, the processor may display the scroll bar indicator 260 in cyan, otherwise the scroll bar indicator may be displayed as gray.

FIG. 3 depicts an exemplary GUI for a checklist, according to one or more embodiments. GUI 300 may include the same features GUI 200, however it may also be different, and it may include a different header 255a, the one or more system completed task indicators 305, the one or more ignored task indicators 310, one or more challenge instructions 315, one or more response instructions 320, and one or more additional information indicators 325.

Specifically, as mentioned above, when a user selects a task with a sub-checklist, the processor may update the display to display the sub-checklist. The different header 255a may correspond to the task title 265 associated with the selected task (or a sub-checklist name if different than the task title 265). The different header 255a may have a font size that is dynamic based on a length of a text string for the task title 265 or the sub-checklist name.

The GUI 200 and GUI 300 may have a status column located on the far left hand side of the displayable area in which the indicators are maintained. As discussed above, the indicators provide an indication of line-by-line condition of tasks.

The one or more challenge instructions 315 and the one or more response instructions 320 may each be associated with an indicator. The one or more challenge instructions 315 may contain text associated with the task the user is to focus attention on. The one or more challenge instructions 315 may be displayed as text in a challenge column to the right of the status column. The one or more challenge instructions 315 may be displayed as text in sentence case, except for acronyms which may be displayed in all capital letters. The text may be left justified and wrap as required in the challenge column.

The one or more response instructions 320 may contains text associated with the task the crew is to the focus on. The one or more response instructions 320 may be displayed as text in a response column to the right of the challenge column. The one or more response instructions 320 may be displayed as text in all capital letters. The text may be right justified, and wrap as required in the response column.

In between the challenge column and the response column may be a spacing column. The spacing column may be in the center of the content area and the spacing column may be a hard-coded textless space that is a minimum touch target width wide. The spacing column may prevent challenge text and response text from overlapping, thereby improving left-to-right reading flow, especially when displayed on small forward displays or small touch displays.

The one or more additional information indicators 325 may be checklist impact notifications (CINs). The one or more additional information indicators 325 may be displayed in a CIN column to the right of the response column. The one or more additional information indicators 325 may be associated with tasks that have additional information related to notes, cautions, and warnings. CINs may provide access to notes, cautions, and warnings for individual tasks by a message popup (see, e.g., FIGS. 8A and 8B and reference numbers 805, 810, and 815). The one or more additional information indicators 325 may be displayed as rounded triangles with an "i" in the center, and the one or more additional information indicators 325 may be displayed in an appropriate color (e.g., red, amber/yellow, cyan, or white).

Figure 4:
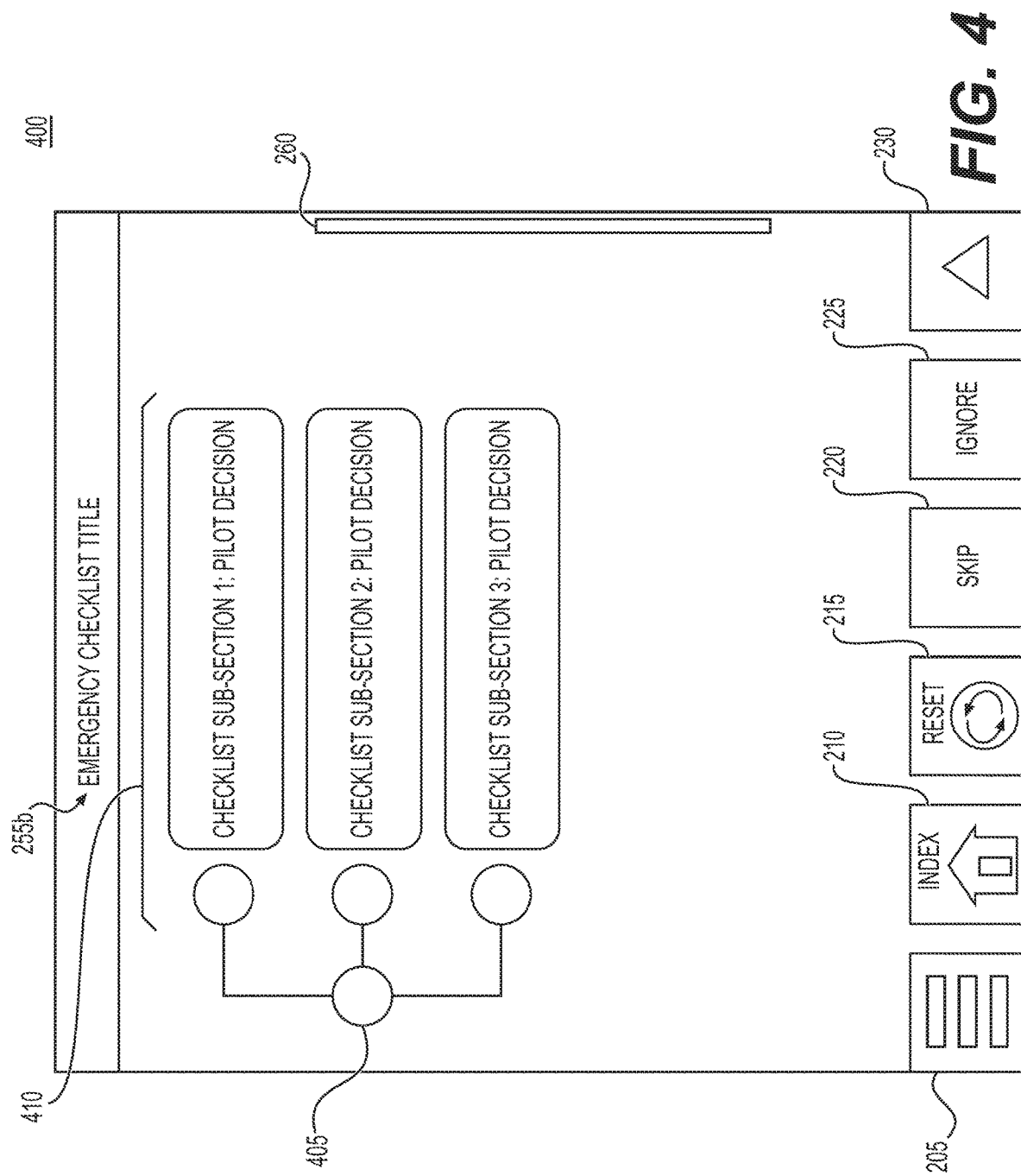
FIGS. 4-6 depicts an exemplary GUI for a checklist, according to one or more embodiments.
Figure 5:
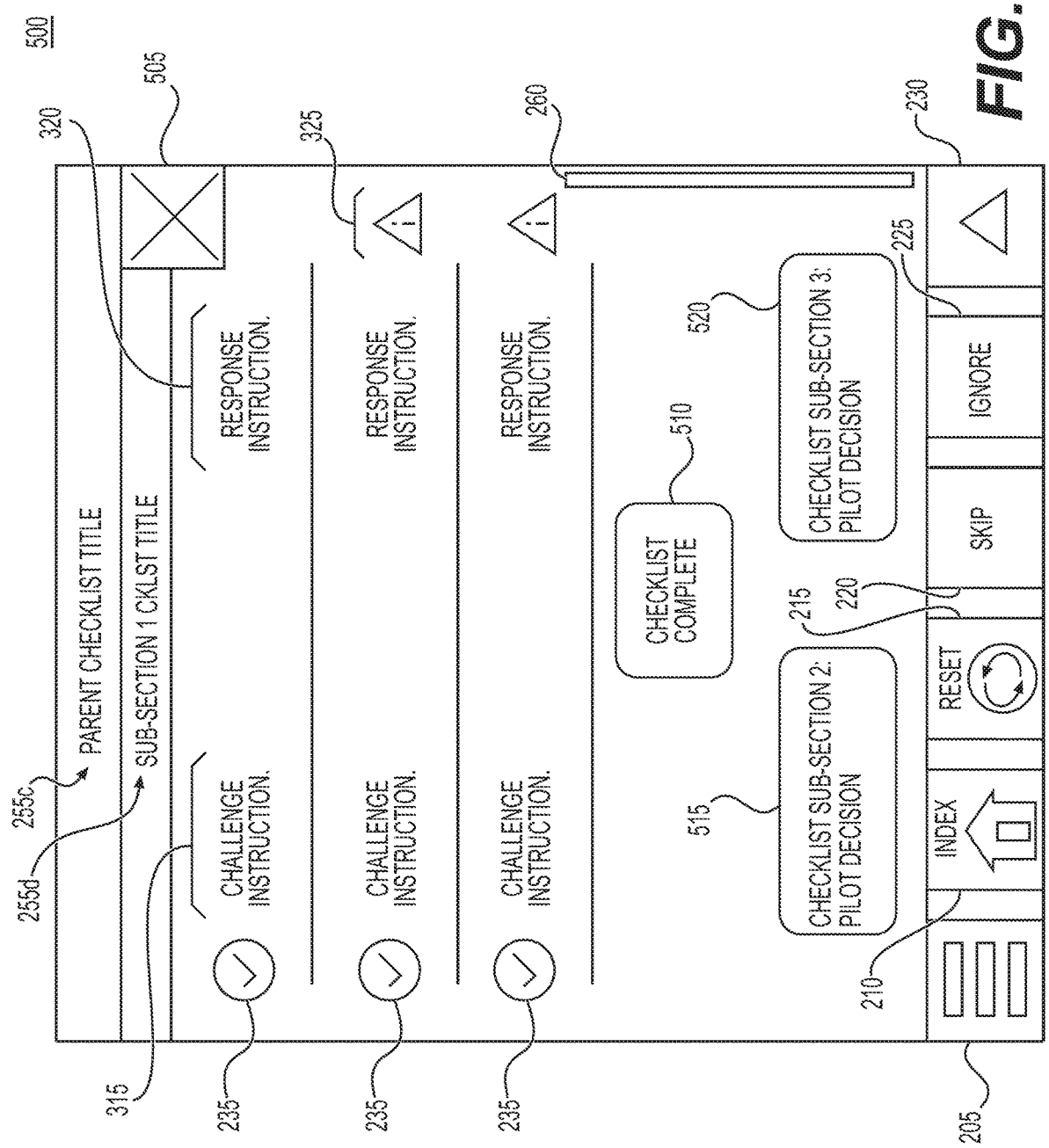
Figure 6:
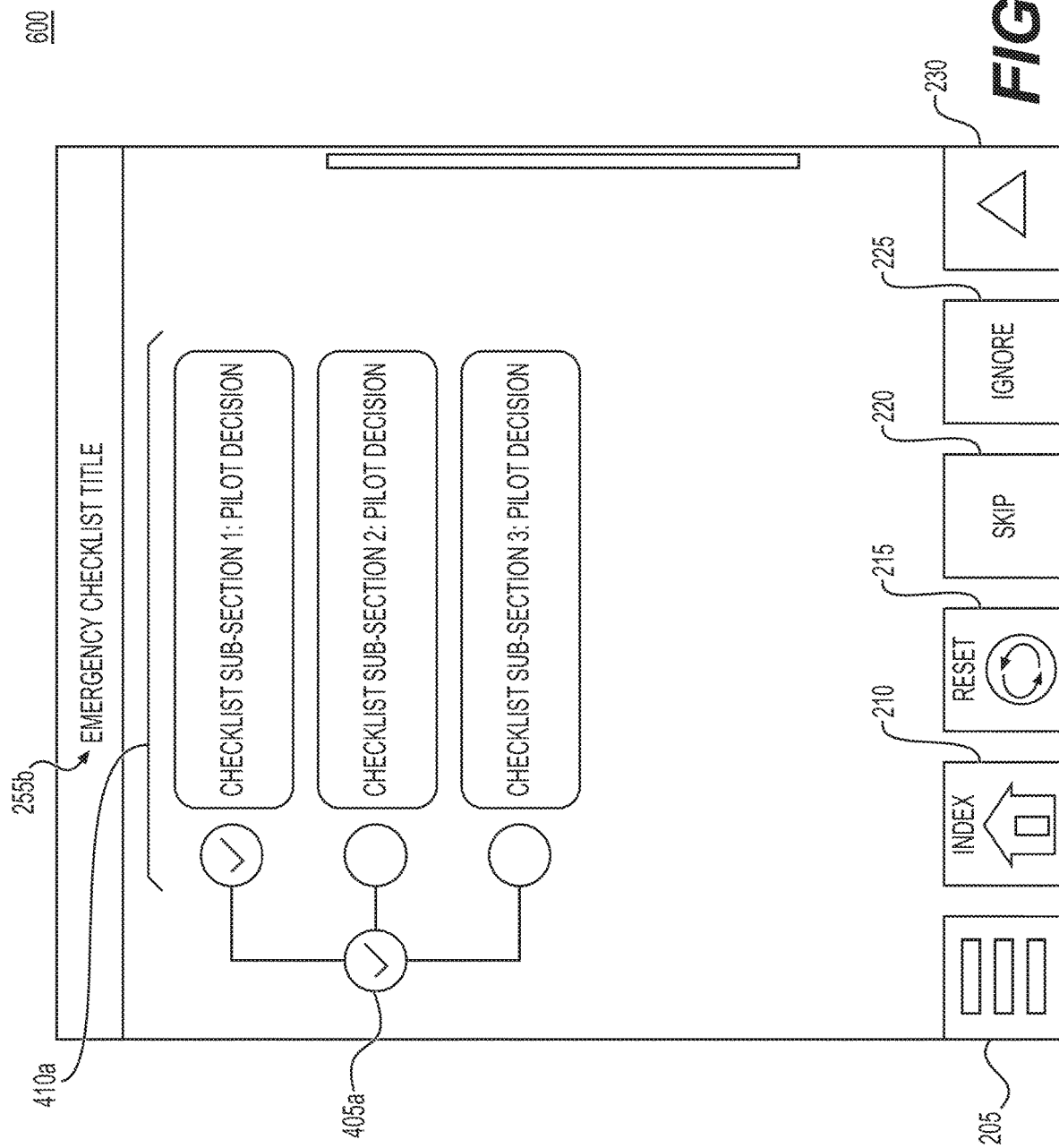

FIGS. 4-6 depicts an exemplary GUI for a checklist, according to one or more embodiments. Specifically, FIGS. 4-6 may depict an emergency checklist. In FIG. 4, GUI 400 may include the same features as GUI 200/300, however it may also be different, and it may include an emergency checklist header 255b, branching checklist 405, and one or more sub-sections 410. The emergency checklist may be selected to be displayed based on a user input on a checklist display in FIGS. 2-3 or in FIGS. 12-14.

The emergency checklist header 255b may be a text string that indicates what emergency checklist is currently being displayed in the display.

The branching checklist 405 may be displayed when the emergency checklist has not be completed by the user of the vehicle/aircraft. The processor may display the branching checklist 405 by an open, light gray circle with leader lines to each of the one or more sub-sections 410 (e.g., decision points in the emergency checklist).

The one or more sub-sections 410 may each have an indicator (discussed above) with a text of sub-section inside a rectangular icon. A user may select one of the one or more sub-sections 410 by a user input, and in response the processor may display a sub-section pop-up 505 (see FIG. 5 below).

In FIG. 5, GUI 500 may be displayed in response to a user input selecting one of the one or more sub-sections 410. GUI 500 may include the same features as GUI 200/300, however it may also be different, and it may include a parent checklist header 255c, a sub-section pop-up 505, a sub-section header 255d, a checklist complete indicator 510, one or more link indicators 515 and 520.

The parent checklist header 255c may correspond to the emergency checklist header 255b discussed above. The sub-section pop-up 505 may include the sub-section header 255d, the checklist complete indicator 510, the one or more link indicators 515 and 520, and one or more tasks for the sub-section pop-up 505 that follow the form of the GUI 300 (indicators with challenge, response, and any CINs). The sub-section header 255d may correspond to the text of sub-section discussed above.

As the user or the system inputs indicate the tasks of the sub-section pop-up 505 are complete, the processor may update the corresponding indicators (to completed indicators) and the checklist complete indicator 510 by, e.g., becoming bold and/or change in color (not depicted).

The one or more link indicators 515 and 520 may be links to other sub-sections of the one or more sub-sections 410. The one or more link indicators 515 and 520 may be selectable by the user by a user input, and the processor may update the display to display a corresponding sub-section pop-up.

In FIG. 6, GUI 600 may include the same features as GUI 400, however it may also be different, and it may include a completed branching checklist 405a, and one or more completed sub-sections 410a of one or more sub-sections 410.

The one or more completed sub-sections 410a of one or more sub-sections 410 may be displayed by the completed task indicator (e.g., a crew completion checkmark as discussed above), in response to a corresponding sub-section being completed (e.g., like in GIF. 5).

The completed branching checklist 405a may be displayed when the emergency checklist has been completed, based on a completed condition being triggered. The completed condition may be determined when at least one sub-section of the one or more sub-sections 410 are complete (e.g., called a disjunctive branching checklist; displayed in FIG. 6) or when all sub-sections of the one or more sub-sections 410 are complete (a conjunctive branching checklist), or some combination thereof based on hierarchical layers (depending on a type of branching for a given emergency). When any combination of completed branching checklists clears the abnormal/emergency aircraft/vehicle condition, the top-level circle is displayed as a completed task indicator (e.g., a crew completed checkmark).

Figure 7:
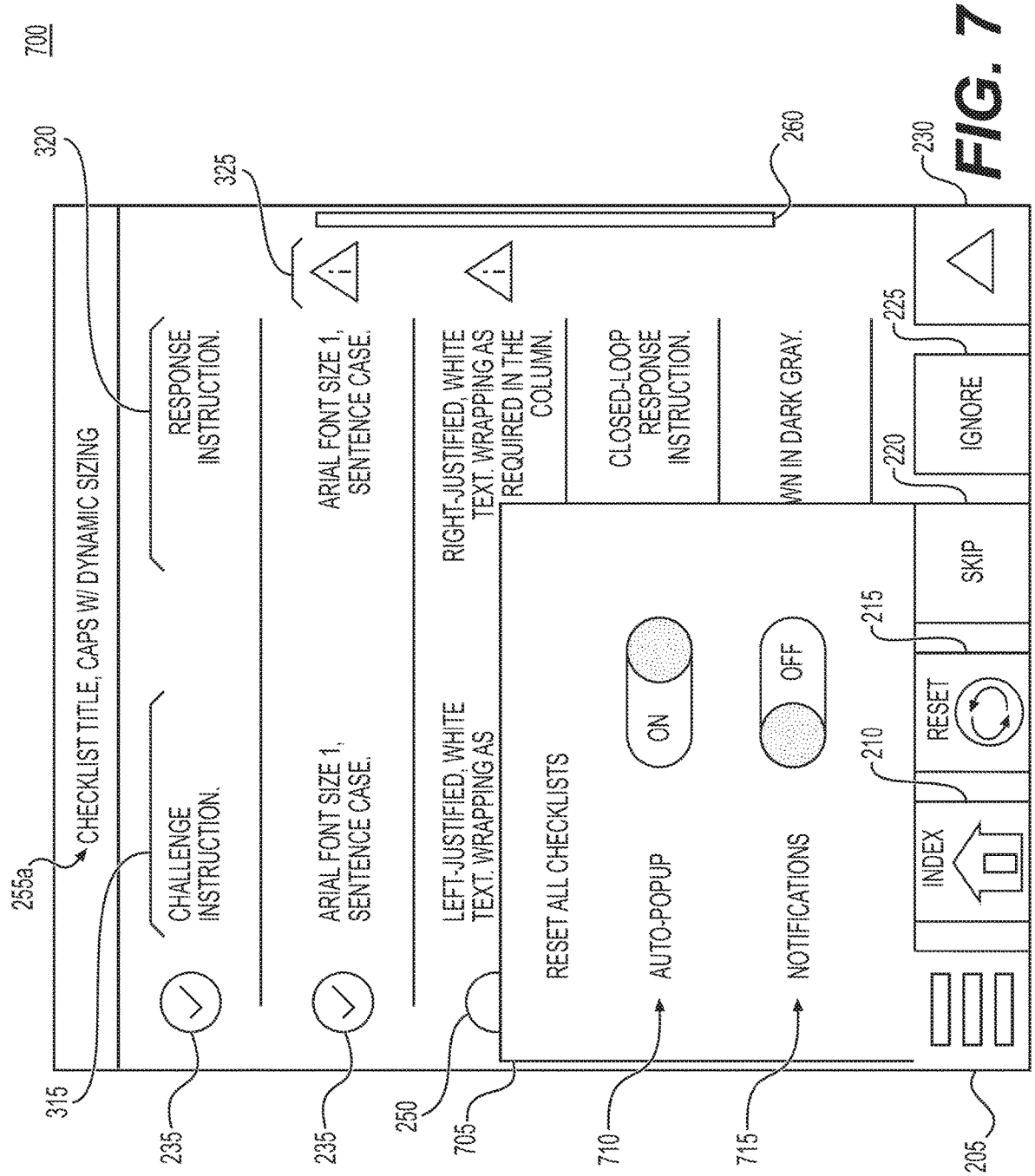
FIG. 7 depicts an exemplary GUI for a checklist, according to one or more embodiments.

FIG. 7 depicts an exemplary GUI for a checklist, according to one or more embodiments. GUI 700 may include the same features as GUI 200/300, however it may also depict the settings pop-up 705. The settings pop-up 705 may include one or more settings 710 and 715. One or more settings 710 and 715 may include (1) a reset all checklists icon, which may refresh all altered checklists, (2) an auto-popup ON/OFF toggle icon, which allows/disallows automatic display of associated pop-ups based on the selection to ON or OFF; (3) a notifications ON/OFF toggle icon that, when toggled on by a user input, expands all of the one or more additional information indicators 325 (e.g., the CINs) until selected OFF by user input, or individual additional information indicators 325 are collapsed by user input.

Figure 8A:
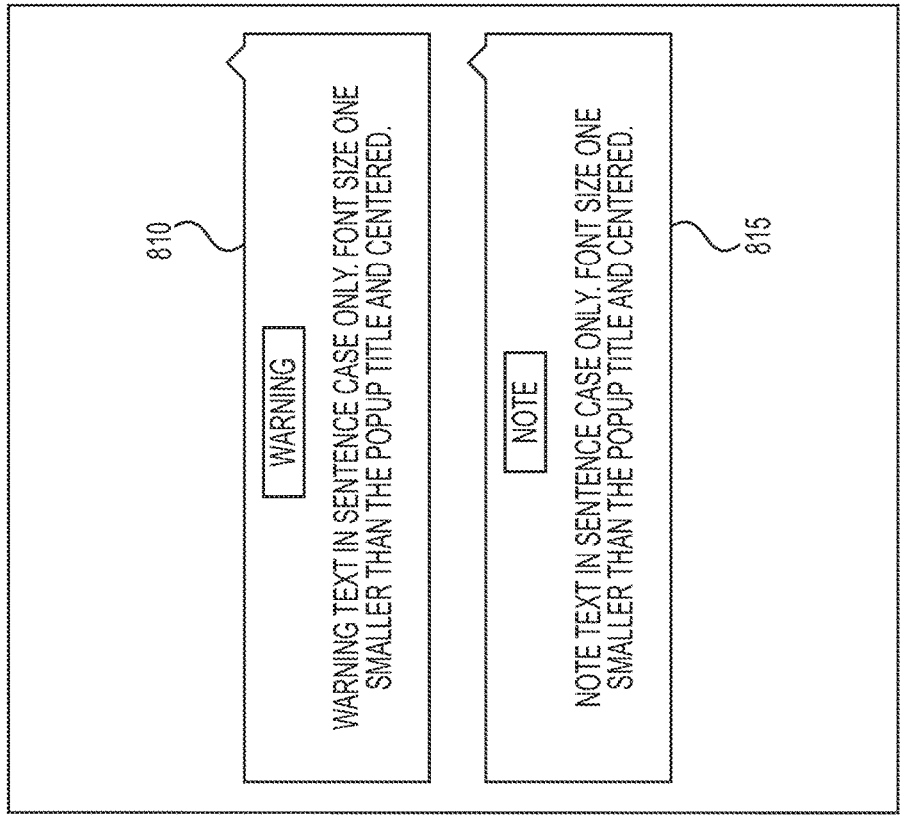
FIGS. 8A and 8B depict an exemplary GUI for a checklist, according to one or more embodiments.
Figure 8B:
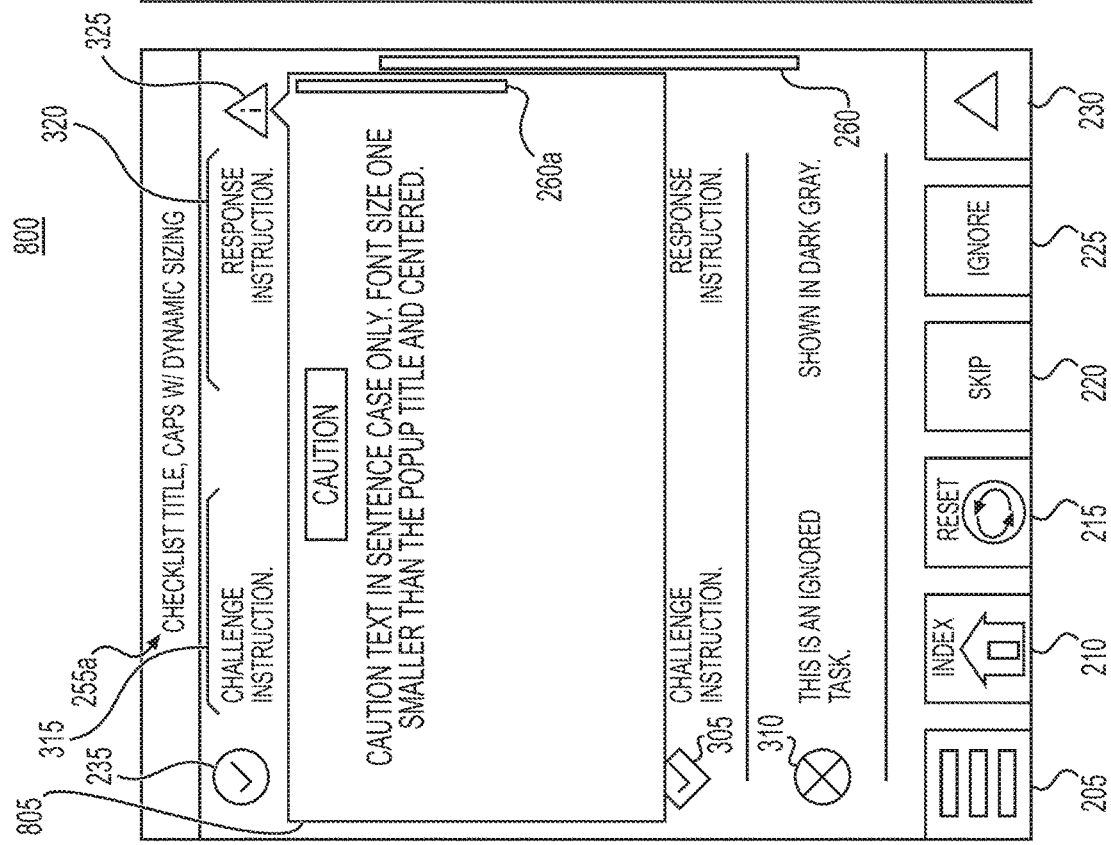

FIGS. 8A and 8B depict an exemplary GUI for a checklist, according to one or more embodiments. GUI 800 may include the same features as GUI 200/300, however it may also be different, and it may include an additional information indicator pop-up. The information indicator pop-up may be (as depicted in FIG. 8A) a caution pop-up 805 or (as depicted in FIG. 8B) a warning pop-up 810 or a note pop-up 815. The information indicator pop-up may have a separate scroll bar indicator 260a.

The user may select one of the one or more additional information indicators 325 by a user input, and the processor may display one of the caution pop-up 805, the warning pop-up 810, or the note pop-up 815, based on underlying information associated with the additional information indicator. The pop-up may be displayed over any main content, thereby focusing attention on the active task and pop-up. The pop-up may also be displayed by applying a transparent shading (e.g., 50%) to the background.

The separate scroll bar indicator 260a may be displayed within any pop-up that has more than a threshold amount of information to be displayed (e.g., based on an amount of text to be displayed). Like with scroll bar indicator 260 above, the separate scroll bar indicator 260a may have a view position and the processor may control the display of the separate scroll bar indicator 260a in a similar manner to the scroll bar indicator 260. The scroll bar indicator 260 may be disabled when a popup is displayed.

Figure 9:
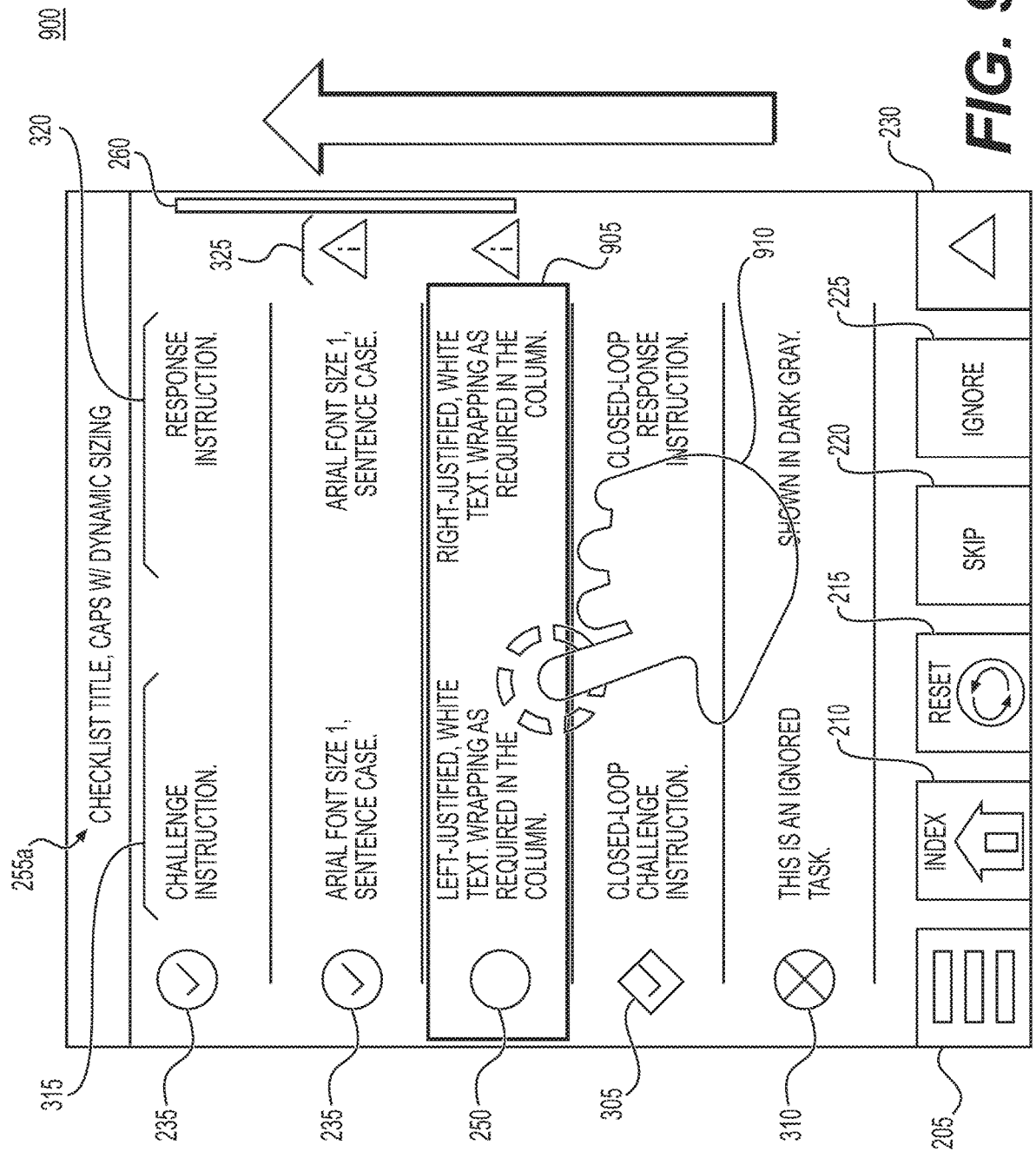
FIG. 9 depicts an exemplary GUI for a checklist, according to one or more embodiments.

FIG. 9 depicts an exemplary GUI for a checklist, according to one or more embodiments. Specifically, GUI 900 may depict how a user may interact with a GUI for a checklist. GUI 900 may include the same features as GUI 200/300, however it may also be different, and it may include an active line indicator 905 which may receive a user input 910. Alternatively, active line indicator 905 may not be displayed to the user, but instead may be considered a reference for which task is currently active for the user to complete For instance, the processor may perform an auto-scrolling process. In the auto-scrolling process, the processor may first associate an active line 905 with a task at a top of a list of a checklist, and the task may be displayed at a top of the display. Then, as a user input or system input indicates tasks are complete, the processor may advance the active line 905 sequentially down the list of tasks to a task in a middle of the display. The processor may skip any tasks that have already been indicated as complete, skipped, or ignored. Then, as the user input or system input indicates additional tasks are complete, the processor may scroll content (e.g., tasks with associated indicators and any additional information indicators 325) in a upward direction while maintaining the active line 905 on a next task in the middle of the screen (as for example in FIG. 9). The arrow of FIG. 9 may indicate how the content scrolls up while the active line 905 remains in position.

The auto-scrolling process may allow the user to maintain a hand position and task awareness when completing a checklist and any associated procedures outside the checklist. For instance, after beginning a checklist, the active task will advance from top of the content area to the middle, and after this point, the content background will scroll upwards, thereby allowing the user to maintain a hand position in the middle of the display.

For instance, user input may be performed by CCD and/or touch gestures on a touch display. When using a CCD, the user may click to advance to a next task (thereby indicating that the task was complete, ignored, or skipped), and based on the click, the processer may automatically scroll the content. Alternatively, when using the CCD, the user may use a scroll wheel to skip one or several tasks, and based on the scroll wheel input, the processor may skip one or several tasks and scroll the associated content. The processor may determine how many tasks to skip by determining a number proportional to the amount of scroll of the wheel. When using a touch display, the user can advance by touching the task to complete a challenge (or ignore/skip), and based on the user input of touching the task, the processor may advance to a next task. For instance, the user may tap (anywhere or in a certain portion of a task), swipe gesture, flick gesture, or by following a task advance behaviors. For instance, the swipe gesture or flick gestures may be in a horizontal direction (i.e., between the left and right sides of the display), and have different positive and negative directions. For instance, a positive direction may be left to right (right swipe/flick) and a negative direction may be right to left (left swipe/flick), and the inputs may have different effects (e.g., left swipe means skip and right swipe means ignore, etc.). The task advance behaviors may include an extended touch (e.g., longer than one second within a specific area of the display) on a task or a multi-touch (e.g., two or more touches at a same time) on a task may have different effects.

Figure 10:
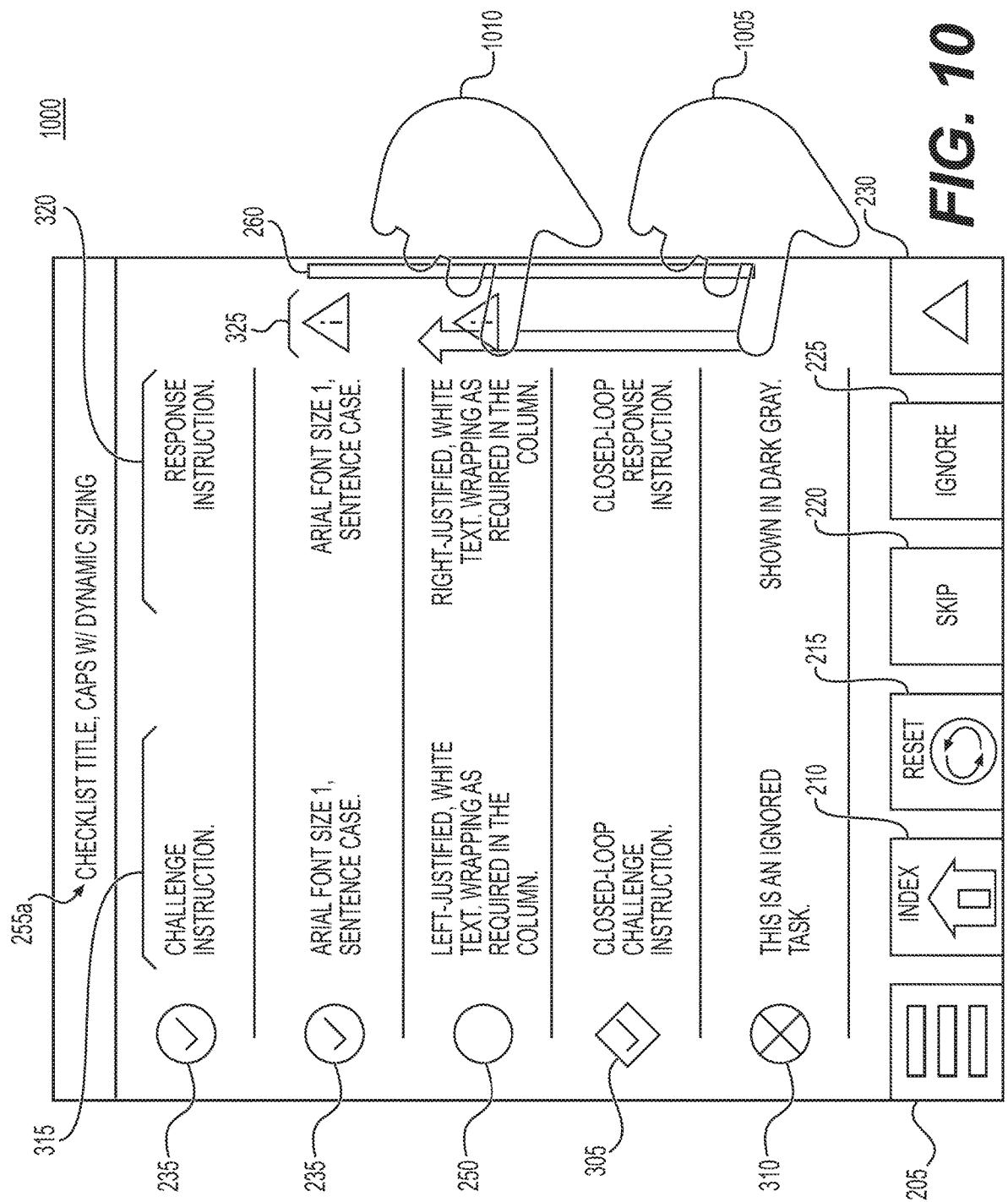
FIG. 10 depicts an exemplary GUI for a checklist, according to one or more embodiments.

FIG. 10 depicts an exemplary GUI for a checklist, according to one or more embodiments. Specifically, GUI 1000 may depict how a user may interact with a GUI for a checklist. GUI 1000 may include the same features as GUI 200/300. GUI 1000 may scroll based on a user input that starts at a first point 1005 and ends at a second point 1010. For instance, the display may be a touch display that may transmit information indicating a user input that starts at the first point 1005 and ends at the second point 1010 in a vertical direction to the processor, and the processor may skip one or several tasks and scroll any associated content (e.g., a number of tasks skipped proportional to an amount of distance between the first point 1005 and the second point 1010 or an amount of vertical distance between the points). The arrow of FIG. 10 may indicate that a upward input (a first point 1005 below a second point 1010) may scroll the content upward, meanwhile a downward input (a first point 1005 above a second point 1010, which is not depicted) may scroll the content downward.

Figure 11:
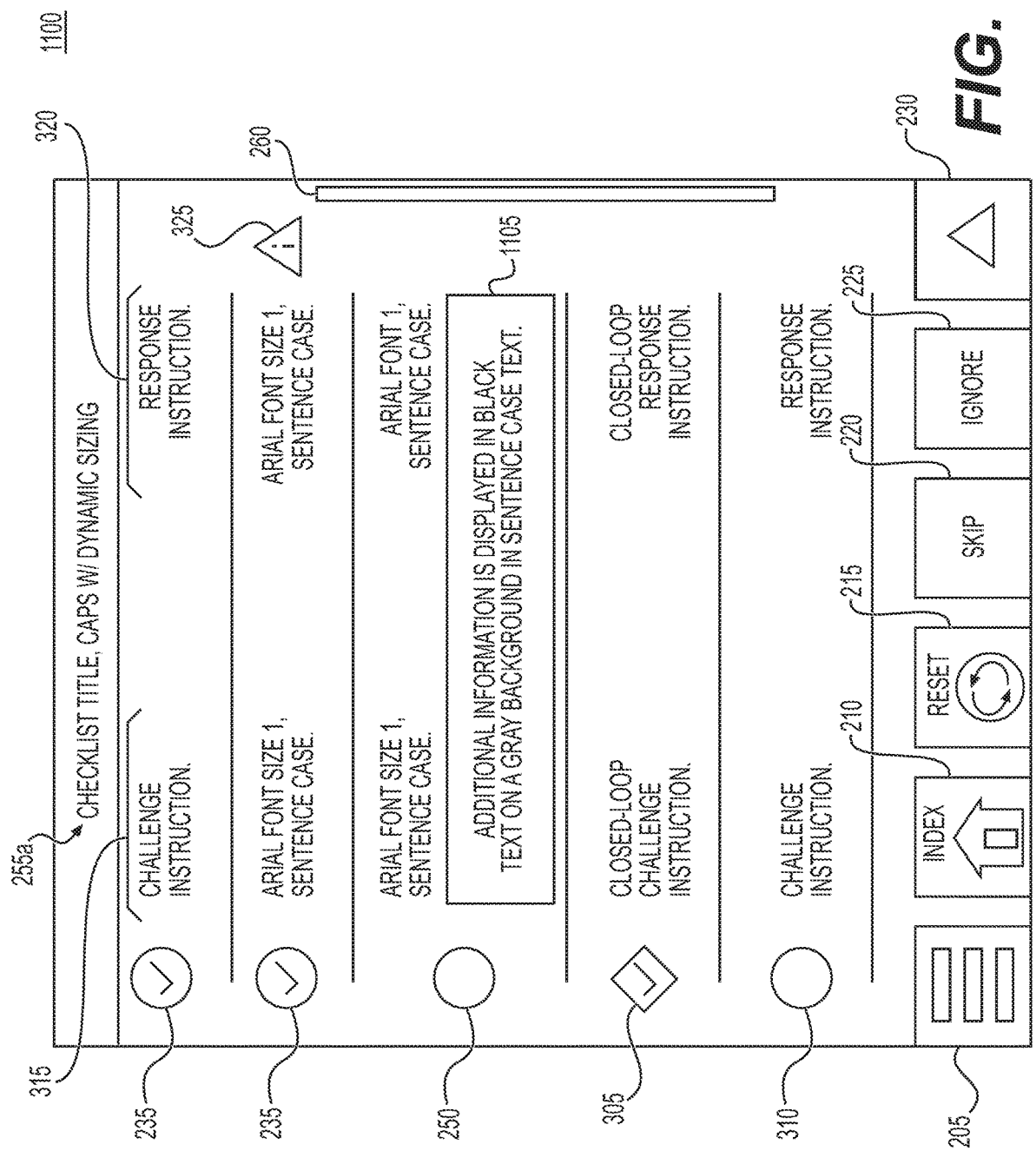
FIG. 11 depicts an exemplary GUI for a checklist, according to one or more embodiments.

FIG. 11 depicts an exemplary GUI for a checklist, according to one or more embodiments. GUI 1100 may include the same features as GUI 200/300, however it may also be different, and it may include one or more information text boxes 1105. The one or more information text boxes 1105 may be associated with one or more tasks. The one or more information text boxes 1105 may be used to visually separate checklist or task information that is not part of a task challenge-response and that is not a CIN. The processor may display the one or more information text boxes 1105 as gray text boxes, which the boxes and text are centered in the display and may cross the spacing column discussed above.

Figure 12:
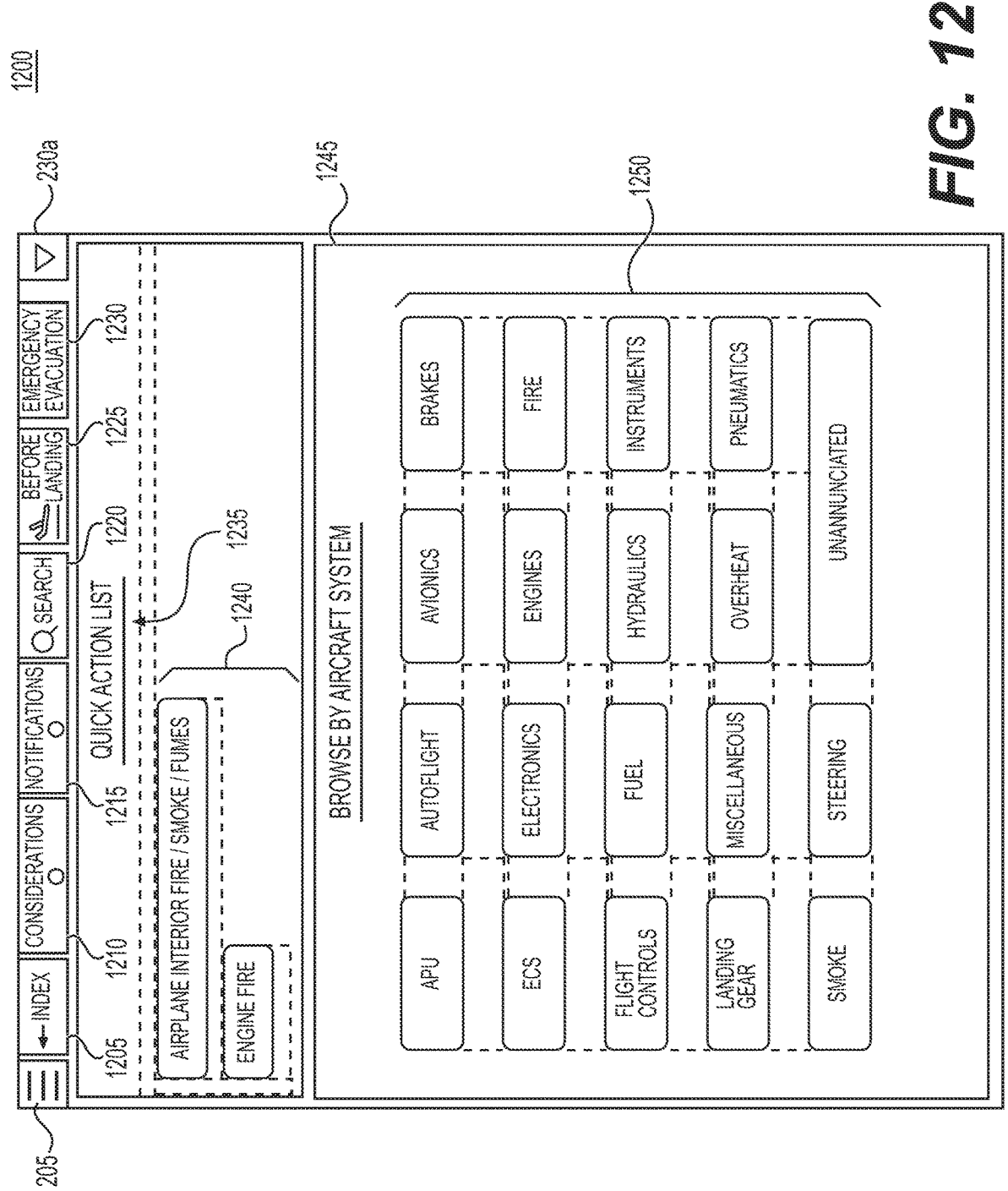
FIG. 12 depicts an exemplary GUI for a checklist, according to one or more embodiments.

FIG. 12 depicts an exemplary GUI for a checklist, according to one or more embodiments. GUI 1200 may include the system function menu icon 205, the second display control drop down menu icon 230*a*, a second index icon 1205, a considerations icon 1210, a notifications icon 1215, a search icon 1220, a phase of operations icon 1225, a status icon 1230, a quick action list 1235 with one or more quick action items 1240, and a browse section 1245 with one or more selectable items 1250.

Generally, checklist layouts are modifiable from the baseline described above. However, for different types of checklists, e.g., Abnormal/Emergency checklists, the different types of checklist may have additional functional features. The additional functional features may be provided regardless of display dimensions or aspect ratio.

The second index icon 1205 may be controlled to behave like the index icon 210 of FIG. 2. The second index icon 1205 may be selected by a user input. Based on the user input, the processor may return the display to the home menu. The home menu may be one of GUI 200 or GUI 1200 based on user inputs to the display control drop down menu icon 230 or the second display control drop down menu icon 230*a*. Furthermore, based on the user input, the processor may return the display to a next level higher than what is currently displayed.

In the home menu of GUI 1200, the user may select from among various items, including the quick action list 1235 with the one or more quick action items 1240 and the browse section 1245 with the one or more selectable items 1250.

The quick action list 1235 with the one or more quick action items 1240 may be a crew alert system (CAS) linked to a list of checklists which are active and ready for a user action. The processor may determine which tasks to be displayed as the one or more quick action items 1240 based on data indicating the checklist are active/necessary/common to be completed. For instance, the system may receive data from a sub-system of the vehicle/aircraft that there is smoke on board the vehicle/aircraft, so the processor may determine smoke related checklists are necessary. The system may have stored associations (based on historical data) that associates certain tasks with phases of operations, and may select relevant tasks based on the current phase of operations. The system may store a list of currently active tasks (e.g., tasks that have a partially complete status indicator), and may select these tasks as the one or more quick action items 1240. The user may select one of the one or more quick action items 1240 by a user input (or may select a CAS message), and the processor may display an associated checklist.

The browse section 1245 with the one or more selectable items 1250 may include groupings of checklists grouped by aircraft/vehicle system (e.g., electronics) or by common features of the checklists (e.g., fire or smoke). The user may select one of the one or more selectable items 1250, and the processor may display a pop-up 1310 (see FIG. 13). The one or more selectable items 1250 may be color coded to indicate severity within the sub-menu, and the categories displayed in the browse section 1245 may be OEM tailorable. The one or more selectable items 1250 may be displayed in rows and columns with or without equal size rectangular icons, and the rows and columns may be evenly spaced from left to right and from bottom to top of the browse section 1245. Any title text of the one or more selectable items 1250 that exceeds a column width may be wrapped in a downward direction. Moreover, if text of a selectable item 1250 cannot be wrapped downward (e.g., because it's a single word), then the associated rectangular icon may be elongated in the horizontal direction to be two columns wide. The one or more selectable items 1250 may be organized in the rows and columns in an alphabetical manner from left to right, and top to bottom.

The considerations icon 1210 may be used to link to checklist special use information. The user may select considerations icon 1210 by a user input, and the processor may display the checklist special use information, e.g., in a pop-up or a new screen.

The notifications icon 1215 may provide the functionality of the notifications ON/OFF toggle icon discussed above with respect to FIG. 7. Specifically, the user may select the notifications icon 1215 by a user input, and the processor may expand or collapse all CINs simultaneously.

Figure 14:
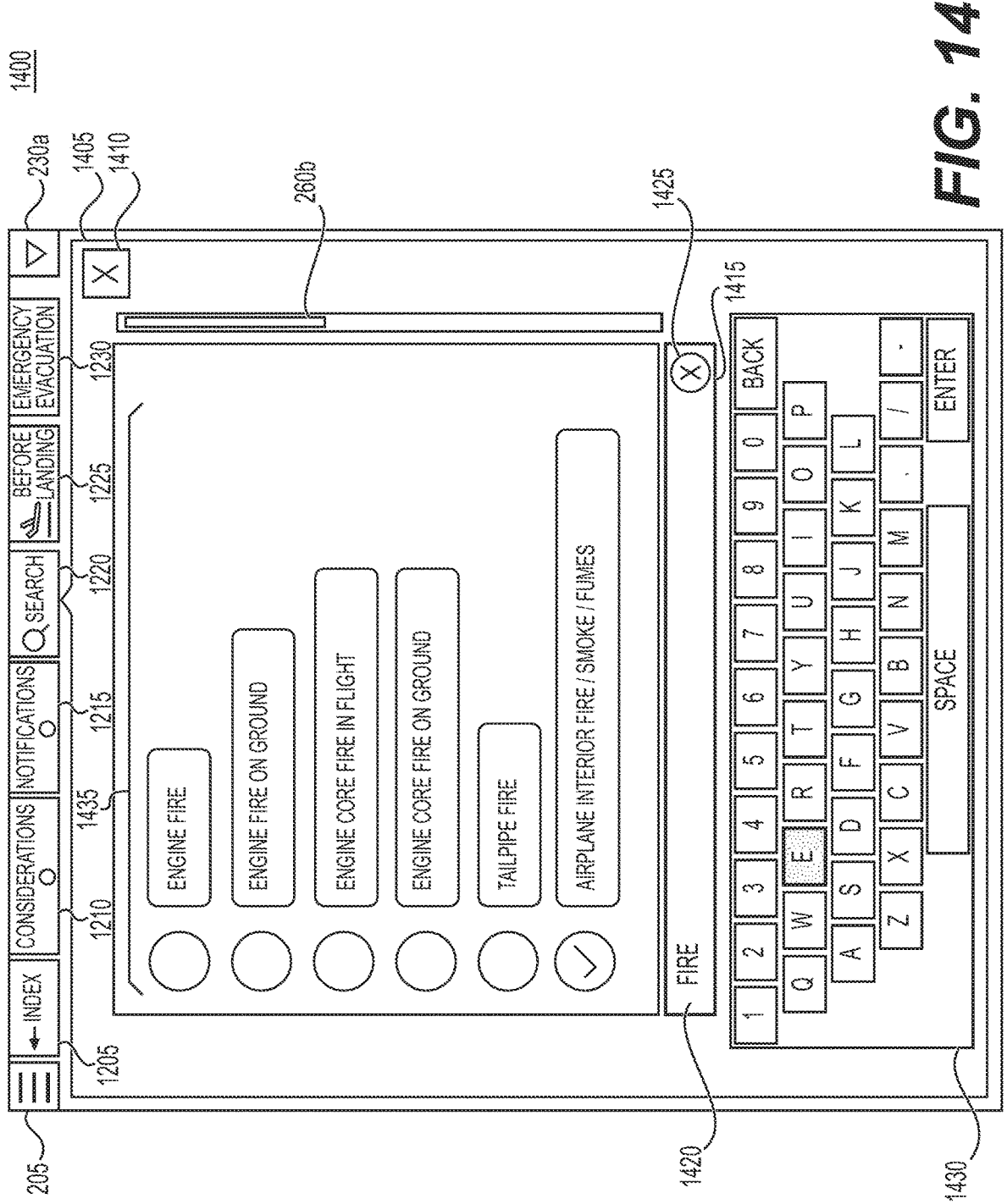
FIG. 14 depicts an exemplary GUI for a checklist, according to one or more embodiments.

The search icon 1220 may provide a search pop-up 1405 as discussed further in FIG. 14.

The phase of operations icon 1225 may display information (e.g., text and/or symbols) that corresponds to a category of operational categories, during which an aircraft/vehicle performs specific procedures unique to a time period. For instance, in FIG. 12, "Before Landing" is displayed as the phase of operations for an aircraft along with a descending aircraft image.

The status icon 1230 may display information (e.g., text) that corresponds to a system status of the vehicle/aircraft. For instance, the system status may be one of normal, abnormal, emergency and/evacuation.

Figure 13:
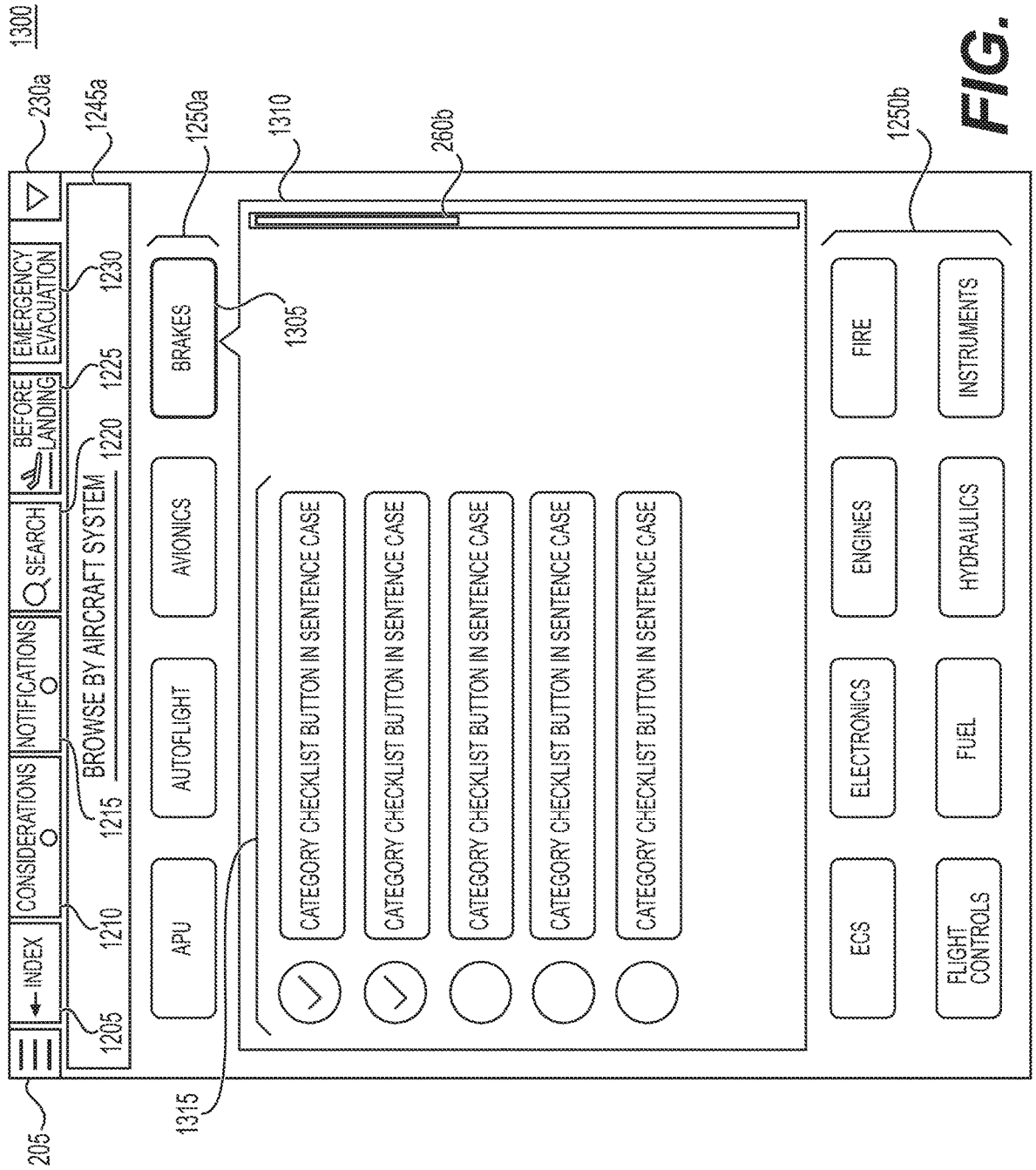
FIG. 13 depicts an exemplary GUI for a checklist, according to one or more embodiments.

FIG. 13 depicts an exemplary GUI for a checklist, according to one or more embodiments. GUI 1300 may include the same features as GUI 1200, however it may also be different, and it may include a modified browse section 1245*a*. The modified browse section 1245*a* may include a first set of selectable items 1250*a* and a second set of selectable items 1250*b* separated by the pop-up 1310. Pop-up 1310 may be connected to a selected item 1305 of the first set of selectable items 1250*a*. In pop-up 1310, there may be one or more category checklist icons 1315 and pop-up scroll bar indicator 260*b*.

The first set of selectable items 1250*a* may include all rows including and above the selected item 1305. The second set of selectable items 1250*b* may include all rows below the selected item 1305. The pop-up 1310 may be positioned below the selected item 1305, and the second set of selectable items 1250*b* may be positioned below the pop-up 1310.

The one or more category checklist icons 1315 may include one of the indicators discussed above and a title inside a rectangular icon. The user may select one of the one or more category checklist icons 1315 by a user input, and the processor may display an associated checklist or, if there is no associated checklist, update the display to mark the task complete.

The pop-up scroll bar indicator 260*b* may have the same functionality as the separate scroll bar indicator 260*a*.

FIG. 14 depicts an exemplary GUI for a checklist, according to one or more embodiments. GUI 1400 may include the same features as GUI 1200, however it may also be different, and it may include a search pop-up 1405. The search pop-up 1405 may be displayed in response to a user input selecting the search icon 1220.

The search pop-up 1405 may allow the user to locate a checklist by a text search. For instance, the text search may search the text of checklist title/name, or by searching text of descriptions of checklists.

In the search pop-up 1405, there may be a close icon 1410, a text entry box 1415, a search string 1420, a delete icon 1425, a text entry box 1430, and a result zone with one or more results 1435 and the pop-up scroll bar indicator 260*b*. The close icon 1410 may exit the search pop-up 1405. The text entry box 1415 may display a current text string that is being searched. The search string 1420 may be the current text string that is being searched (e.g., "FIRE" in FIG. 14). The search string 1420 may be entered by sequential user inputs in the text entry box 1430 either by a user touch on a touch display or by a user input to a hardwire device, e.g., the CCD, or by a physical keyboard. The text entry box 1430 may have a standard keyboard layout. The delete icon 1425 may remove the entire search string 1420 and end the search for that search string 1420. The result zone with one or more results 1435 may display search results that have a similar functional properties of the one or more category checklist icons 1315; for instance, the user may select one of the one or more results 1435 by a user input, and the processor may display an associated checklist or, if there is no associated checklist, update the display to mark the task complete.

Figure 15:
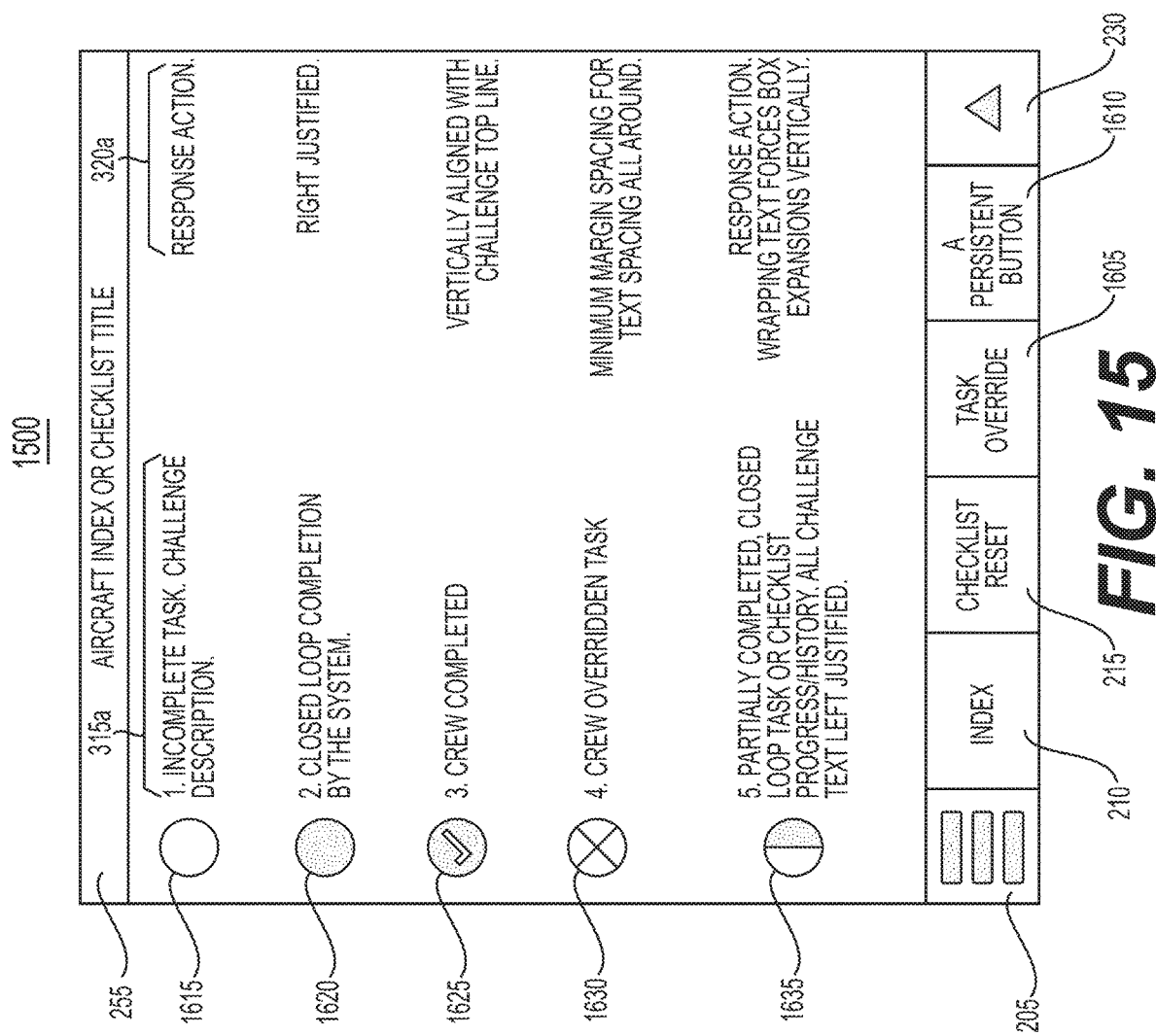
FIGS. 15 and 16 depict exemplary GUIs for a checklist, according to one or more embodiments.
Figure 16:
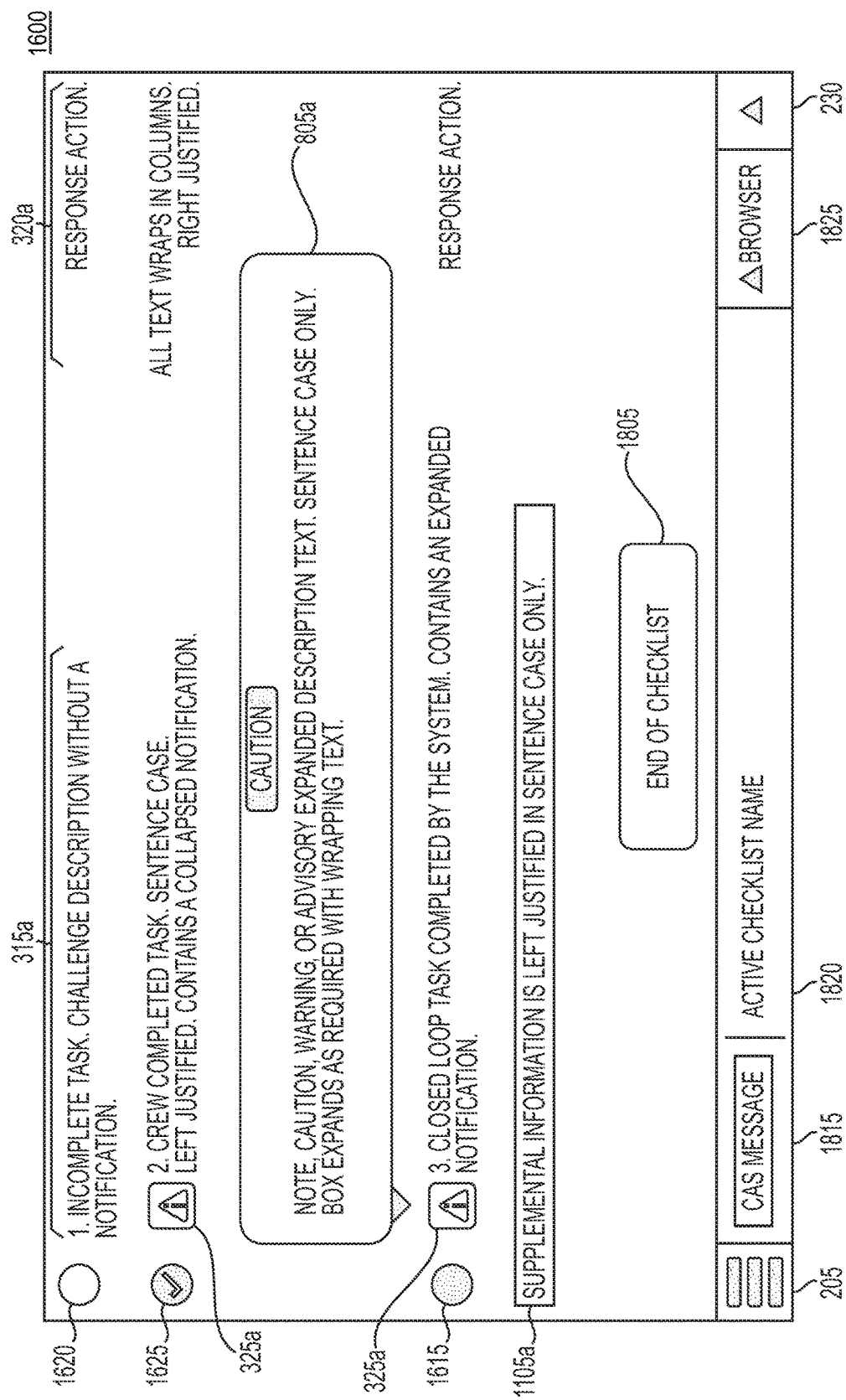
Figure 18:
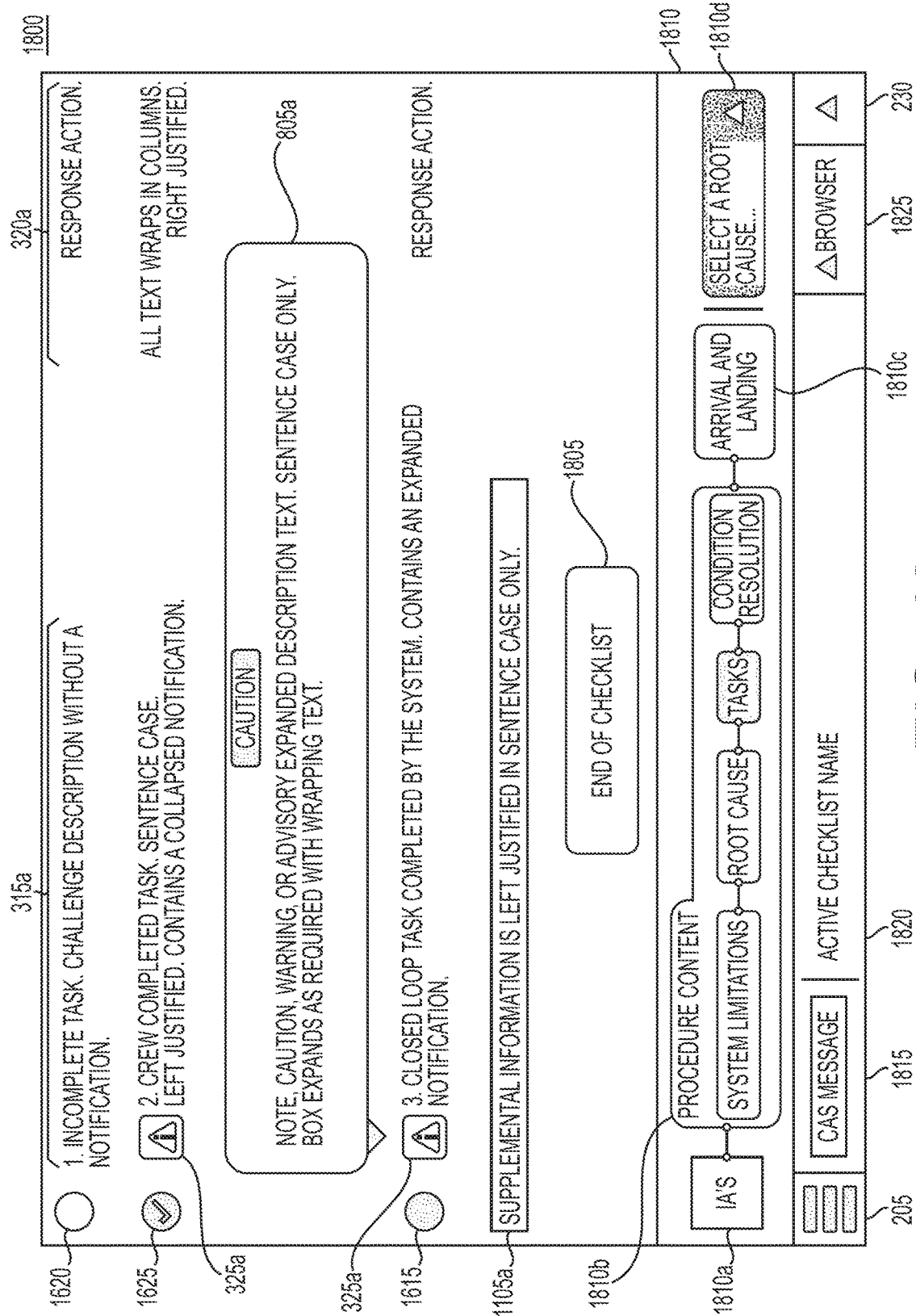
FIGS. 18 and 19 depict exemplary GUIs for a checklist, according to one or more embodiments.
Figure 19:
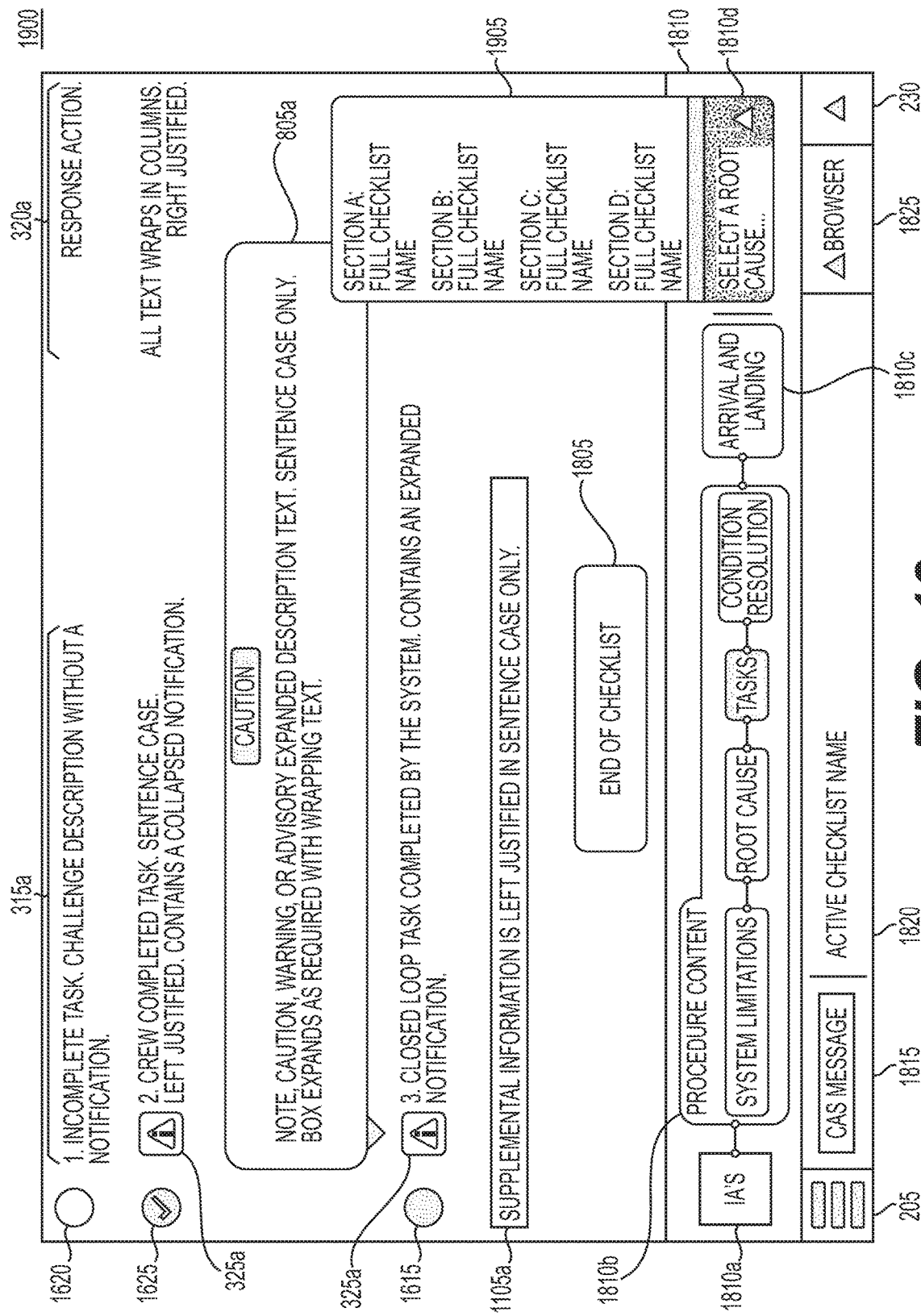

FIGS. 15, 16, 18, and 19 depict exemplary GUIs for a checklist, according to one or more embodiments. In FIG. 15, GUI 1500 may depict a normal operating conditions checklist. Normal operating conditions checklists may be checklists for day-to-day, routine flight operations, such as takeoff or landing processes. In FIG. 16, GUI 1600 may depict a non-standard operating conditions checklist. Non-standard operating conditions checklists may be checklists for any situation that is not a normal operating conditions checklist, e.g., such as emergency checklists. In FIGS. 18 and 19, GUIs 1800 and 1900 may depict a non-standard complex conditions checklist. Non-standard complex conditions checklists may be a subset of the non-standard operating conditions checklists, and may be for checklists that require multiple decisions/determinations by the user to select a proper checklist and/or task to resolve the situation or emergency.

The configuration file may include a variable for each checklist that indicates whether a checklist is a normal operating conditions checklist, a non-standard operating conditions checklist, or a non-standard complex conditions checklist. The processor may access the configuration file and determine a variable for an active checklist, and generate a corresponding checklist GUI for the active checklist.

The GUI 1500 may include the same features as GUI 200/300, however it may also be different, and it may include the group of home icons (e.g., one or more of the system function menu icon 205, the index icon 210, the reset icon 215, a task override icon 1605, an OEM persistent icon 1610, the display control drop down menu icon 230), the header 255, one or more challenge instructions 315*a*, one or more response actions 320*a*, and one or more status indicators (e.g., from among a group comprising: an incomplete status indicator 1615, a system completed status indicator 1620, a crew completed status indicator 1625, a crew override status indicator 1630, and a partial complete status indicator 1635.).

The OEM persistent icon 1610 may be an icon selectable by a user to activate a function defined by the OEM, e.g., access a search function or access a hierarchical menu for the checklist, etc. The one or more challenge instructions 315*a* and the one or more response actions 320*a* may be the same as the one or more challenge instructions 315 and/or the one or more response instructions 320 of FIG. 3 discussed above.

The incomplete status indicator 1615, the system completed status indicator 1620, the crew completed status indicator 1625, the crew override status indicator 1630, and/or the partial complete status indicator 1635 may correspond to, and perform a similar function as, the one or more completed task indicators 235, the one or more partially completed task indicators 240 and 245, and/or the one or more incomplete task indicators 250, as depicted in FIG. 2, and/or the one or more system completed task indicators 305, and/or the one or more ignored task indicators 310 as depicted in FIG. 3 (collectively "indicators"). Specifically, the incomplete status indicator 1615, the system completed status indicator 1620, the crew completed status indicator 1625, the crew override status indicator 1630, and/or the partial complete status indicator 1635 may correspond to status indicators as depicted in FIG. 17.

FIG. 17 depicts completion statuses for a GUI for a checklist, according to one or more embodiments. Specifically, FIG. 17 depicts a chart 1700 that associates a status with an indicator.

The incomplete status indicator 1615 may be displayed for tasks that are not yet completed, or that have been skipped and not yet completed. The incomplete status indicator 1615 may be displayed using an open circle or a circle with empty space background (e.g., no fill of color different than a background color).

The partial complete status indicator 1635 may be displayed for tasks that have sub-checklists that are not fully complete (e.g., at least one task of the sub-checklist has not been completed). The partial complete status indicator 1635 may be displayed using circle with a portion filled in. Specifically, the partial complete status indicator 1635 may be displayed using a circle with two radial lines that form an angle. The area of the partial complete status indicator 1635 may include two separated areas. The first separated area may display an empty space background, and the second separated area may display a filled space background (e.g., a fill color different than a background color). The angle between the two radial lines and the second separated area may correspond to a percentage of completed tasks of the sub-checklist, e.g., according to a step-wise function. For instance, as depicted in FIG. 17, if more than one task but not more than first threshold (e.g., 10%) of tasks are complete for the sub-checklist than the incomplete status indicator 1615 may be displayed; if more than the first threshold but not more than a second threshold (e.g., 25%) of tasks are complete for the sub-checklist than the angle may be 45°; if more than the second threshold but not more than a third threshold (e.g., 33%) of tasks are complete for the sub-checklist than the angle may be 90°; if more than the third threshold but not more than a fourth threshold (e.g., 50%) of tasks are complete for the sub-checklist than the angle may be 135°; if more than the fourth threshold but not more than a fifth threshold (e.g., 66%) of tasks are complete for the sub-checklist than the angle may be 180°; if more than the fifth threshold but not more than a sixth threshold (e.g., 75%) of tasks are complete for the sub-checklist than the angle may be 225°; if more than the sixth threshold but not more than a seventh threshold (e.g., 90%) of tasks are complete for the sub-checklist than the angle may be 270°; if more than the seventh threshold but not all of tasks are complete for the sub-checklist than the angle may be 315°, if all of the tasks are complete for the sub-checklist than the system completed status indicator 1620 or the crew completed status indicator 1625 may be displayed. The actual number of thresholds, and threshold values, may vary in different embodiments.

The display of the partial complete status indicator 1635 may serve as a visual checklist history, thereby avoiding the need for a dedicated menu. Furthermore, the display of partial complete status indicator 1635 may be a general demonstration of how much of the checklist is complete and incomplete, thereby indicating to the user how much a sub-checklist is complete/incomplete.

The system completed status indicator 1620 may be displayed for tasks that have been indicated as complete the system. The system may indicate a task is complete when a task is automatically detected, analyzed, synthesized, and/or performed by the system for the crew. For instance, a task may be completed by the user or the system (for the user); a task system (a vehicle or aircraft system associated with the task connected to the system) may transmit a message to the system indicating a change in status (e.g., engine on); the system may receive the message and determine the task has been completed. The system completed status indicator 1620 may be displayed using a filled circle (e.g., a circle with a fill color different than a background color). The system completed status indicator 1620 may be associated with tasks called a Closed Loop task.

The crew completed status indicator 1625 may be displayed for tasks marked complete by a user. A user may mark a task complete by a user input. The user input may be a selection of the task, thereby indicating that the task has been completed. The crew completed status indicator 1625 may be displayed using a filled circle with a checkmark inside the circle (e.g., a circle with a fill color different than a background color and the checkmark of a different color of the fill color; the checkmark color may the same as the background color or different than the background color).

The crew override status indicator 1630 may be displayed for tasks that have been marked by the user to override a task. A user may override a task by selecting the task override icon 1605 by, e.g., a user input on the task override icon 1605. The crew override status indicator 1630 may be a circle with empty space background (e.g., no fill of color different than a background color) and/or two crossed lines transecting the circle (e.g., perpendicular to each other).

As discussed above, in FIG. 16, the GUI 1600 may depict a non-standard operating conditions checklist. Non-standard operating conditions checklists may be checklists for any situation which is not a normal operating conditions checklist, e.g., such as emergency checklists. The GUI 1600 may include the same features as the GUI 1500, however it may also be different, and it may include one or more additional information indicators 325*a*, an additional information menu 805*a*, one or more information text boxes 1105*a*, an end of checklist icon 1805, and/or a different group of home icons.

The one or more additional information indicators 325*a* may be checklist impact notifications (CINs). The one or more additional information indicators 325*a* may be displayed in a CIN column in between the one or more challenge instructions 315*a* and the one or more status indicators. The one or more additional information indicators 325*a* may be associated with tasks that have additional information related to notes, cautions, and warnings. CINs may provide access to notes, cautions, and warnings for individual tasks by displaying the additional information menu 805*a*. The one or more additional information indicators 325*a* may be displayed as rounded triangles with an "i" in the center, and the one or more additional information indicators 325*a* may be displayed in an appropriate color (e.g., red, amber/yellow, cyan, or white).

The additional information menu 805*a* may be a caution indicator (as depicted in FIG. 16), a warning indicator, or a note indicator. The additional information menu 805*a* may have a separate scroll bar indicator.

The user may select one of the one or more additional information indicators 325*a* by a user input, and the processor may display one of the caution indicator, the warning indicator, or the note indicator, based on underlying information associated with the additional information menu 805*a*. The additional information menu 805*a* may be displayed over any main content, thereby focusing attention on the active task and the additional information menu 805*a*. The additional information menu 805*a* may also be displayed by applying a semi-transparent shading (e.g., 50%) to the background.

Alternatively, the additional information menu 805*a* may be displayed above/below corresponding tasks associated with the additional information menu 805*a* or the one or more additional information indicators 325*a*. Specifically, in the case that tasks are displayed in vertical order, the additional information menu 805*a* may be inserted between the corresponding task and an adjacent task, thereby shifting tasks below the corresponding task in a downward direction in the GUI.

The one or more information text boxes 1105*a* may be associated with one or more tasks. The one or more information text boxes 1105*a* may be used to visually separate checklist or task information that is not part of a task challenge-response and that is not a CIN. The processor may display the one or more information text boxes 1105*a* as text boxes (e.g., with a rectangular border and background of a different color than a GUI background and text within the border). The one or more information text boxes 1105*a* may be displayed above/below corresponding tasks associated with the one or more information text boxes 1105*a*, and the boxes and text may be left justified.

The end of checklist icon 1805 may be selectable by the user to end an active checklist by marking the active checklist completed. The end of checklist icon 1805 may also be selectable by the user to change the view from the active checklist to a parent checklist.

The different group of home icons may be the same as the group of home icons discussed above with respect to FIG. 15, however the different group of home icons may include a CAS message icon 1815, active checklist icon 1820, and browser icon 1825, instead of the index icon 210, the reset icon 215, the task override icon 1605, and the OEM persistent icon 1610.

The CAS message icon 1815 may be displayed when one or more CAS messages are active to be presented to the crew, either in a CAS window (separate from the checklist GUI) or in the checklist GUI. The CAS message icon 1815 may include a text-string, such as "CAS Message", or a text-string based on a content of the CAS message, such a text-string based on an alert of the CAS message. The CAS message icon 1815 may be dynamically resized based a length of a CAS message. For instance, the CAS message icon 1815 may expand horizontally to include more text of a CAS message while maintaining the height of the CAS message icon 1815.

The CAS message icon 1815 may be selectable by a user input to display a CAS message (e.g., if there is only one active CAS message) or, alternatively, to display a menu of the one or more CAS messages (not displayed). In the menu of the one or more CAS messages, the user may select a CAS message to be displayed by selecting a CAS message from the one or more CAS messages. If there are no active CAS messages, the CAS message icon 1815 may not be displayed and the active checklist icon 1820 may be expanded horizontally (see, e.g., search bar 2005 of FIG. 20 described below), therefore informing the user that there are no active CAS messages.

The active checklist icon 1820 may correspond to the header 255 to display a title of the active checklist. The active checklist icon 1820 may be dynamically resized (e.g., by changing a font size of a text-string corresponding to the title) so that the title stays on a single line. Alternatively, the active checklist icon 1820 may display a search text-string to indicate that the user may perform a search function (see, e.g., search bar 2005 of FIG. 20 or search bar 2105 of FIG. 21 described below). The active checklist icon 1820 may be selectable by a user input to activate the search function. In response to a user input on the active checklist icon 1820, the checklist GUI program may start the search function.

The browser icon 1825 may be selectable by a user input to launch a browser. The browser may be a menu of all functions, checklists, and systems of the checklist system.

As discussed above, in FIGS. 18 and 19, the GUIs 1800 and 1900 may depict a non-standard complex conditions checklist. Non-standard complex conditions checklists may be a subset of the non-standard operating conditions checklists, and may be for checklists that require multiple decisions/determinations by the user to select a proper checklist and/or task to resolve the situation or emergency. The GUI 1800 may include the same features as the GUI 1600, however it may also be different, and it may include complex procedure section 1810. The complex procedure section 1810 may persist on all GUIs until the situation or emergency is resolved, e.g., as indicated by a relevant checklist being completed. The complex procedure section 1810 may be displayed above the group of home icons.

The complex procedure section 1810 may include a determination flow that includes an immediate action icon 1810a, a procedure section 1810b, a phase of flight icon 1810c, and/or a selection menu icon 1810d. The procedure section 1810b may include a system limitations icon, a root cause icon, a tasks icon, and/or a condition resolution icon. The immediate action icon 1810a, the system limitations icon, the root cause icon, the tasks icon, and the condition resolution icon of the procedure section 1810b, and the phase of flight icon 1810c may be selectable by a user input to access content related to of the icons, respectively.

The immediate action icon 1810a, when selected by a user input, may cause a menu (either a pop-up or as a link to a separate GUI) to display one or more tasks that are to be completed immediately. The tasks that are to be completed immediately may be defined in the configuration file for the active checklist; generally, the tasks may be tasks that are common to several checklists that are related (e.g., in the case of fire, certain tasks may be performed irrespective of the root cause).

The system limitations icon, which may be within selection menu 1810d, when selected by a user input, may cause a menu (either a pop-up or as a link to a separate GUI) to display aircraft systems (e.g., all or systems relevant to an active checklist), a current status for each of the displayed aircraft systems, and/or limitations, if any, for each of the displayed aircraft systems. From the menu, a user may select aircraft systems to perform actions associated with the aircraft systems or to make changes to the limitations for each of the displayed aircraft systems. For instance, the user may indicate that a system is no longer responsive, only able to perform a certain function(s), or output an amount of performance.

The root cause icon, when selected by a user input, may cause a menu (either a pop-up or as a link to a separate GUI) to display potential causes of a situation, such as fire in engine or fire in cabin, along with information about each situation. The user may select a root cause from this menu or by user inputs on the selection menu icon 1810d.

The tasks icon, which may be within selection menu 1810d, when selected by a user input, may cause a menu (either a pop-up or as a link to a separate GUI) to display tasks (e.g., in the form of a checklist) to be accomplished. The user may indicate one or more tasks of this menu are complete or the system may indicate the tasks are complete by receiving inputs from relevant systems.

The condition resolution icon, which may be within selection menu 1810d, when selected by a user input, may cause a menu (either a pop-up or as a link to a separate GUI) to display decision sections. The decision sections may display a form with one or more fields. The form may display questions to be answered the user by user inputs into the one or more fields. For instance, the form may include questions relevant to the active checklist or situation, such as for instance where smoke is in/on the aircraft and the user may input locations. The one or more fields may be radio/toggle buttons, selection menus, text-input, etc.

The phase of flight icon 1810c may indicate what is a next action a user is to take. For instance, it may be advisable to land as soon as possible (e.g., due to a fire), so the phase of flight icon 1810c may indicate the aircraft should arrive and land the aircraft.

Alternatively, the phase of flight icon 1810c may display a current phase of flight, such as takeoff, cruise, arrival, landing, etc. The phase of flight icon 1810c may initially be set based on a phase of flight variable stored in the configuration file. The phase of flight variable may be changed based on user input and/or system inputs (e.g., landing gear is deployed). The phase of flight icon 1810c, when selected by a user input, may cause a menu (either a pop-up or as a link to a separate GUI) to display selections of phase of flight in order to change or confirm the phase of flight variable. The phase of flight variable may be used to determine (by the processor) a checklist for the situation. For instance, the processor may determine a first checklist for takeoff, a second checklist for landing, etc. in the case of fire, according to the phase of flight variable.

The selection menu icon 1810d may be a user input field for the root cause icon or the phase of flight icon 1810c. The GUI 1900 may include the same features as the GUI 1800, however it may also be different, and it may include a menu 1905. The menu 1905 may be displayed in response a user input on the selection menu icon 1810d, or in response to a user input on the root cause icon or the phase of flight icon 1810c. The menu 1905 may display one or more options selectable by the user. For instance, in response to a user input on the root cause icon, the menu 1905 may be displayed, and the user may make a user input selecting one of the options.

The checklist GUI program may obtain the user inputs as a user progresses through the complex procedure section 1810. The user might not progress sequentially from left to right. The checklist GUI program may, based on the user inputs, systems limitations, selected root cause, phase of flight variable (in one aspect of the disclosure), a completed form, and/or completed tasks, generate or select a checklist to resolve the situation.

Figure 20:
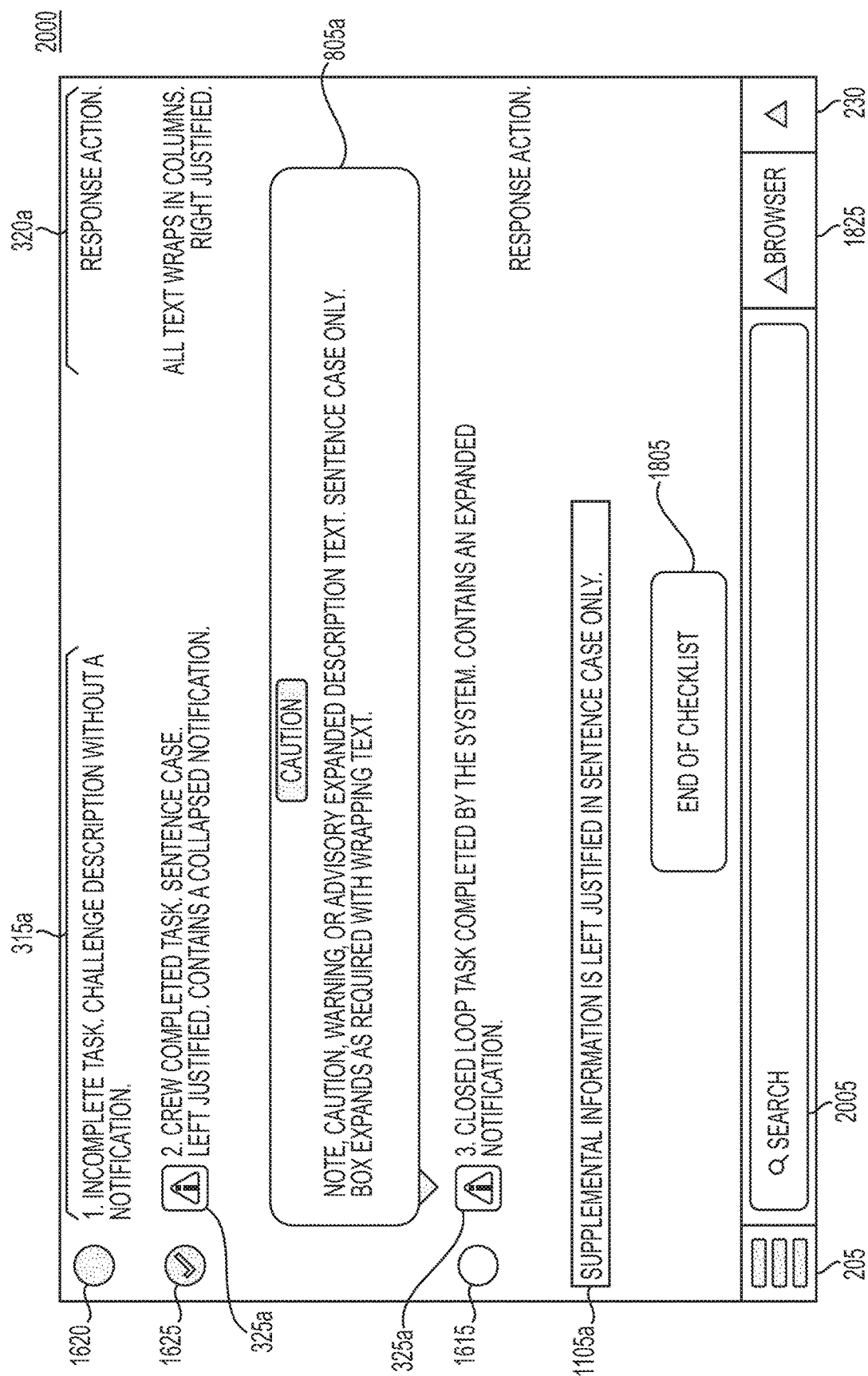
FIGS. 20 and 21 depict exemplary GUIs for a checklist, according to one or more embodiments.
Figure 21:
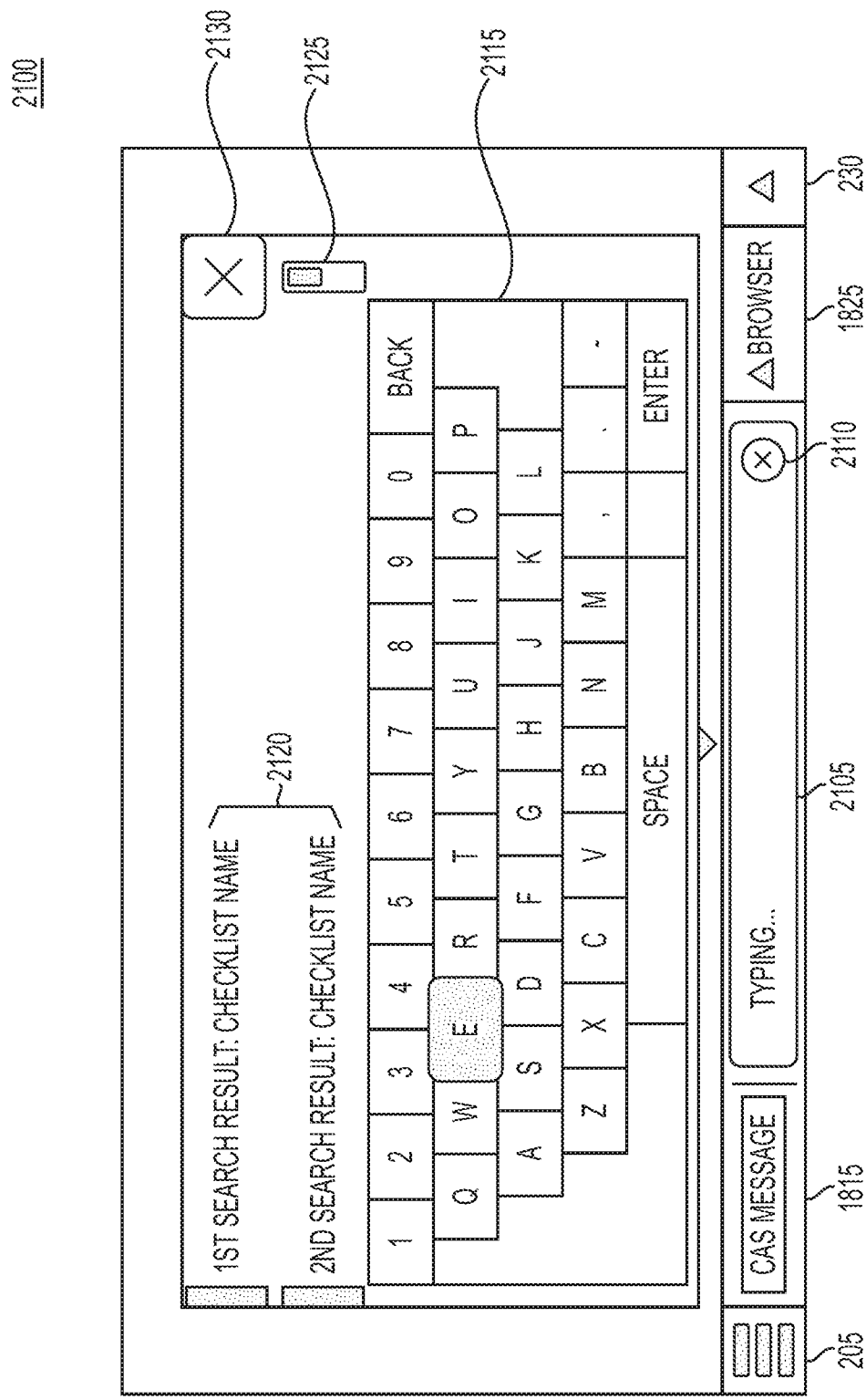

FIGS. 20 and 21 depict exemplary GUIs for a checklist, according to one or more embodiments. In FIG. 20, GUI 2000 may depict a search bar on a non-standard operating conditions checklists without an active CAS message. The GUI 2000 may include the same features as the GUI 1600, however it may also be different, and it may include a search 2005.

In FIG. 21, GUI 2100 may depict a search bar and search function section, in response to a user input on the search bar 2005 or active checklist icon 1820. The GUI 2100 may include the same features as the GUI 1600, however it may also be different, and it may include a search bar 2105, a close icon 2110, a text-entry section 2115, one or more results 2120, a scroll bar indicator 2125, and/or a close icon 2130.

The search bar 2005 may be selectable by a user input to activate the search function. In response to a user input on the active checklist icon 1820, the checklist GUI program may start the search function.

The search bar 2105 may display an actively entered string. The text-entry section 2115 may be a touch screen text-entry area. For instance, the text-entry section 2115 may have different configurations to enter alphanumeric text-strings (e.g., letters and/or numerals), based on user inputs. The clear icon 2110 may be a clear button to clear an entered text, based on user inputs. Alternatively or in addition, the clear icon 2110 may also operate to terminate the search function, e.g., based on a defined type of user input different than a user input to clear the entered text. The close icon 2130 may operate to terminate the search function, based on an user input. The scroll bar indicator 2125 may perform a similar function as the scroll bar indicator 260.

The one or more results 2120 may be generated by a text-match algorithm. The user-entered text may be compared to text of checklist titles, descriptions of tasks, descriptions of checklists, aircraft systems, etc. and matches to the user-entered text may be displayed the one or more results 2120.

Figure 22:
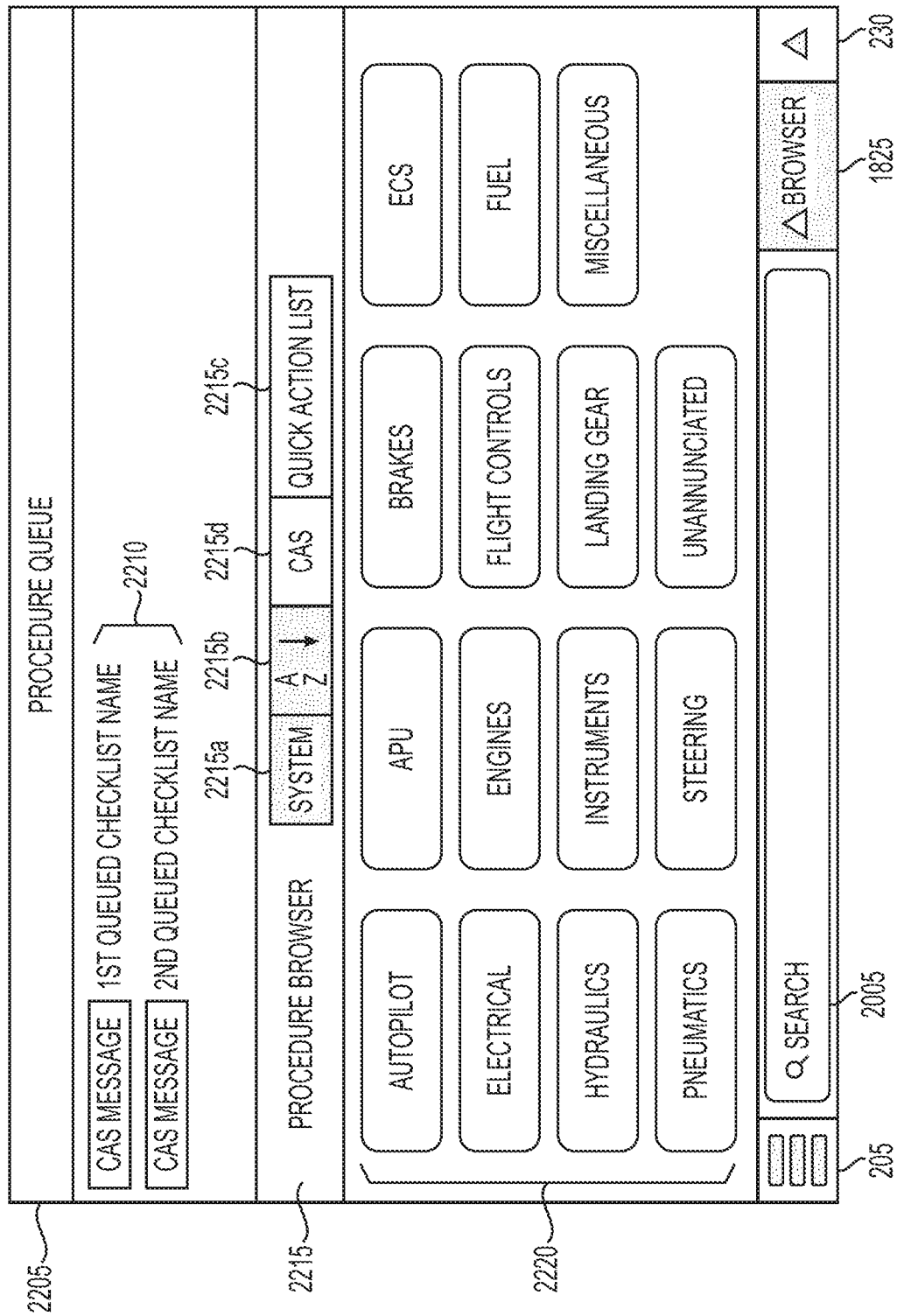
FIGS. 22 and 23 depict exemplary GUIs for a checklist, according to one or more embodiments.
Figure 23:
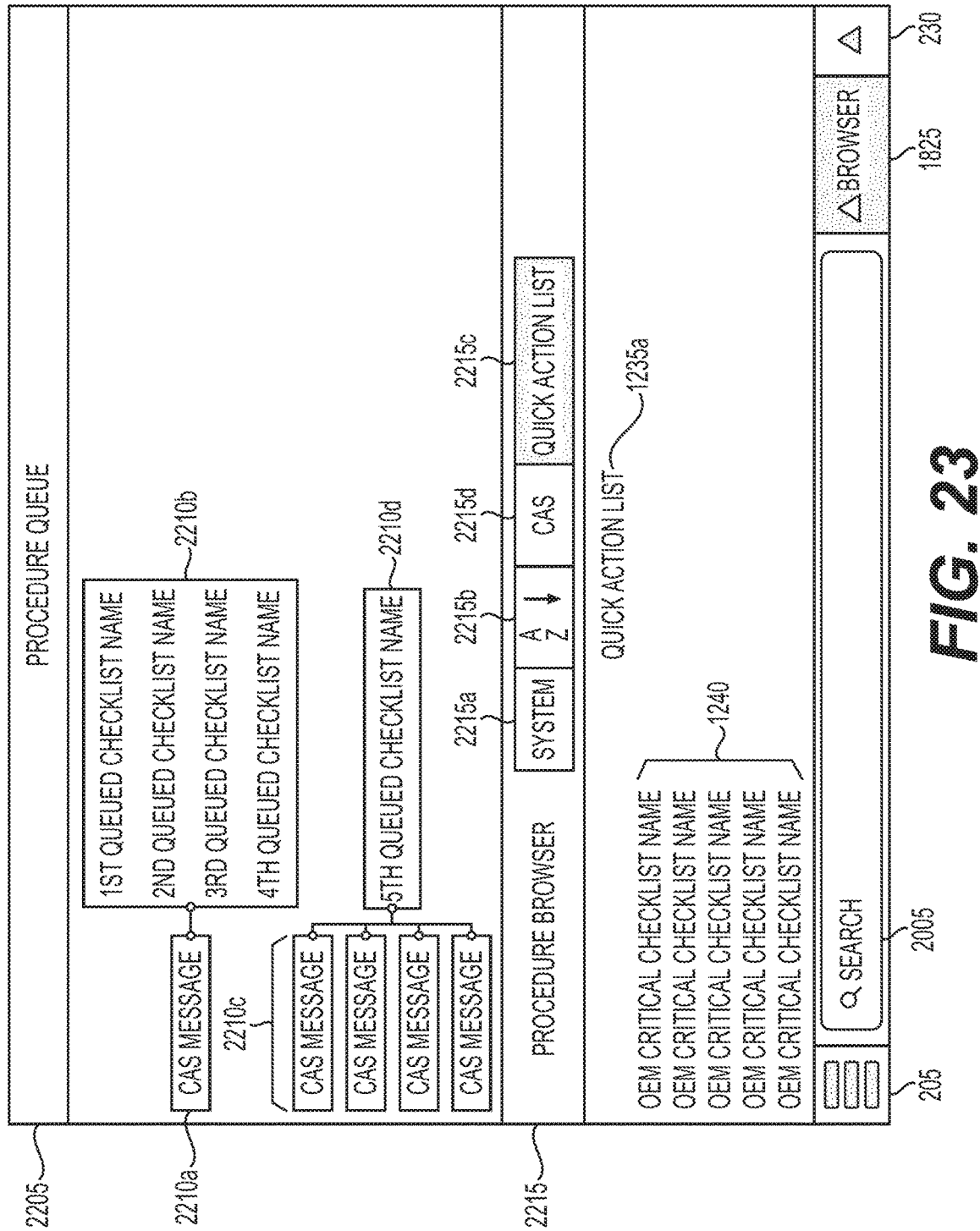

FIGS. 22 and 23 depict exemplary GUIs for a checklist, according to one or more embodiments. In FIGS. 22 and 23, GUIs 2200 and 2300 may depict a procedure queue and procedure browser. Specifically, the GUIs 2200 and 2300 may include the same features as the GUI 1600, however they may also be different, and they may include a procedure queue section 2205 and a procedure browser section 2215.

The procedure queue section 2205 may display one or more active CAS messages with one or more corresponding checklist icons 2210. As shown in FIG. 22, the one or more active CAS messages with the one or more corresponding checklists 2210 may have a one-to-one correspondence. However, as shown in FIG. 23, the one or more active CAS messages with the one or more corresponding checklist icons 2210 may have a one-to-many correspondence. Specifically, CAS message 2210a may be associated with multiple checklist icons 2210b, meanwhile multiple CAS messages 2210c may be associated with a single checklist icon 2210d. The CAS messages may display similar information as the CAS message icon 1815 discussed above. The checklist icons may display a checklist title or name. The checklist icons may be selectable by a user to start the checklist and the GUI may updated to display a corresponding checklist GUI, such as depicted in FIG. 16 or 18. A mapping between CAS message(s) and checklist(s) may be stored in the configuration file. The processor may obtain active CAS messages, retrieve the mapping from the configuration file, and determine which checklists to be displayed with the CAS messages.

The procedure browser section 2215 may display checklists by different sorting and organization schemes. Specifically, the procedure browser section 2215 may include a toggle menu and a display region. The toggle menu may include sort by system icon 2215a, an alphabetical order icon 2215b, a CAS icon 2215d, and/or a quick action list icon 2215c. All items in the toggle menu may be simultaneously selectable by a user.

The sort by system icon 2215a may display one or more selectable items 2220. The one or more selectable items 2220 may be the same as the one or more selectable items 1250 discussed above with respect to FIG. 14. When the sort by system icon 2215a is selected, the alphabetical order icon 2215b is automatically selected as well.

The alphabetical order icon 2215b may order results (e.g., selectable items 2220) in alphabetical order (e.g., left-to-right, top-to-bottom). If the alphabetical order icon 2215b is selected by a defined user input (e.g., successive user inputs), the list may be sorted in reverse alphabetical order.

The quick action list icon 2215c may display a quick action list 1235a. The quick action list 1235a may be the same as the quick action list 1235 with one or more quick action items 1240.

The CAS icon 2215d may filter the selectable items 222 or the quick action items 1240. Specifically, the CAS icon 2215d may filter the selectable items 222 or the quick action items 1240 based on active CAS messages and the mapping discussed above. The remaining items of the filtered selectable items 222 or the quick action items 1240 may be displayed like the one or more results 2120.

Figure 24:
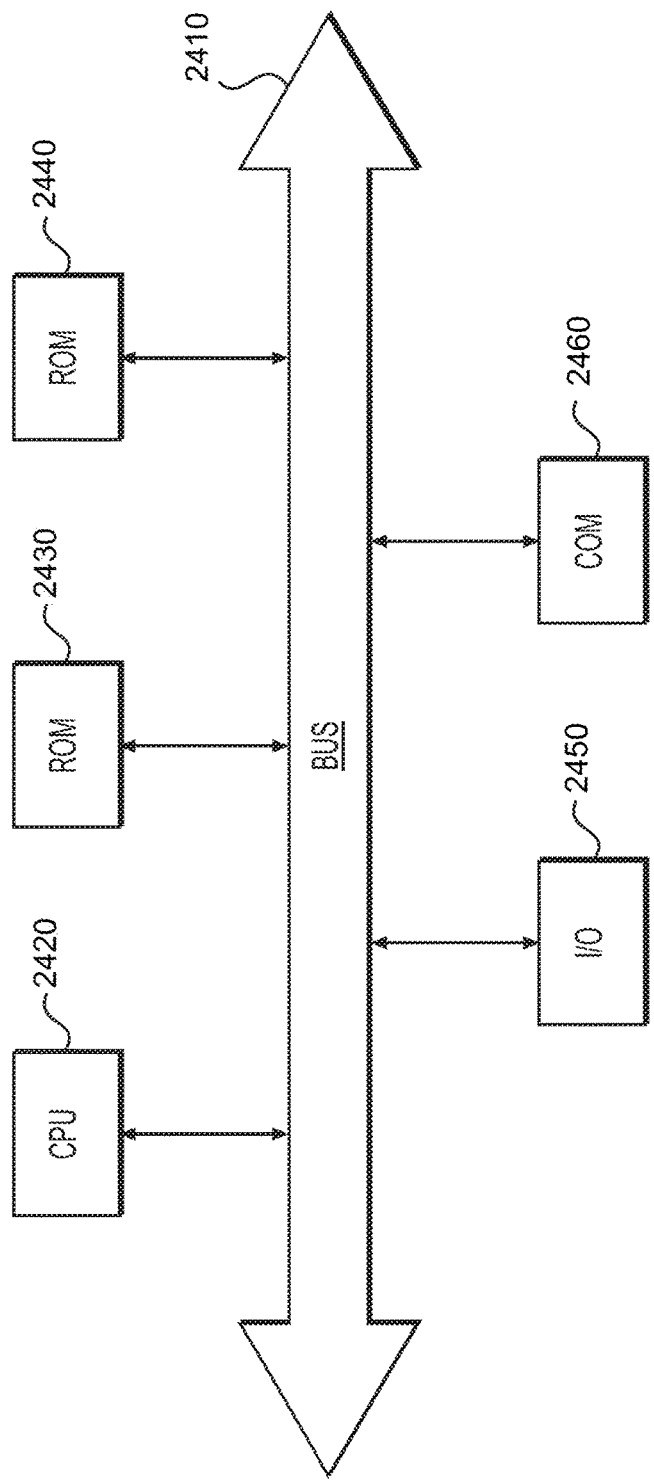
FIG. 24 depicts an example system that may execute techniques presented herein.

FIG. 24 depicts an example system that may execute techniques presented herein. FIG. 24 is a simplified functional block diagram of a computer that may be configured to execute techniques described herein, according to exemplary embodiments of the present disclosure. Specifically, the computer (or "platform" as it may not a be a single physical computer infrastructure) may include a data communication interface 2460 for packet data communication. The platform may also include a central processing unit ("CPU") 2420, in the form of one or more processors, for executing program instructions. The platform may include an internal communication bus 2410, and the platform may also include a program storage and/or a data storage for various data files to be processed and/or communicated by the platform such as ROM 2430 and RAM 2440, although the system 2400 may receive programming and data via network communications. The system 2400 also may include input and output ports 2450 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for updating a graphic user interface (GUI) of a vehicle, the method comprising:
    generating and displaying a checklist GUI with a plurality of tasks on a display, the checklist GUI corresponding to a non-standard operating conditions checklist or a non-standard complex conditions checklist;
    determining whether a user or a system indicated that a task of the plurality of tasks is complete;
    in response to determining that the user indicated that the task is complete, updating the checklist GUI to change a status indicator of the task to a first type of status indicator; and
    in response to determining that the system indicated that the task is complete, updating the checklist GUI to change the status indicator of the task to a second type of status indicator.

2. The method of claim 1, wherein the checklist GUI includes status indicators associated with the plurality of tasks, and the status indicators are selected from among:
    an incomplete task indicator,
    an ignored task indicator,
    a partially complete task indicator,
    a user completed indicator, and
    a system completed indicator.

3. The method of claim 1, wherein, when the checklist GUI corresponds to the non-standard operating conditions checklist, the checklist GUI includes a branching checklist and one or more sub-sections,
    the branching checklist is displayed as a circle with lines to each of the one or more sub-sections, and
    the one or more sub-sections are selectable by a user input to display a sub-section pop-up.

4. The method of claim 3, wherein the branching checklist is displayed as a completed branching checklist when a completed condition is triggered, the completed condition is triggered when at least one sub-section of the one or more sub-sections are complete, when all sub-sections of the one or more sub-sections are complete, or any combination thereof based on hierarchical layers.

5. The method of claim 1, wherein, when the checklist GUI corresponds to the non-standard complex conditions, the checklist GUI includes a complex procedure section,
    the complex procedure section includes a determination flow that includes an immediate action icon, a procedure section, a phase-of-flight icon, and/or a selection menu icon,
    the procedure section includes a system limitations icon, a root cause icon, a tasks icon, and/or a condition resolution icon, and
    the immediate action icon, the system limitations icon, the root cause icon, the tasks icon, and the condition resolution icon of the procedure section, and the phase-of-flight icon are selectable by a user input to access content related to icons, respectively, and/or input data.

6. The method of claim 5, wherein the immediate action icon, when selected by a user input, causes a menu to display one or more tasks that are to be completed immediately, the system limitations icon, when selected by a user input, causes a menu to display aircraft systems, a current status for each of the aircraft systems, and/or limitations, if any, for each of the aircraft systems, for a selection of aircraft systems to perform actions associated with the aircraft systems or to make changes to the limitations for each of the aircraft systems, the root cause icon, when selected by a user input, causes a menu to display potential causes of a situation, for a selection of a root cause, and the condition resolution icon, when selected by a user input, causes a menu to display decision sections, the decision sections display a form with one or more fields to input data.

7. The method of claim 6, further comprising:

as a user progresses through the complex procedure section, obtaining user inputs, systems limitations, a selected root cause, a phase-of-flight variable, a completed form, and/or completed tasks; and based on the user inputs, the systems limitations, the selected root cause, the phase-of-flight variable, the completed form, and/or the completed tasks, generating or selecting a checklist to resolve a situation.

8. A system for updating a graphic user interface (GUI) of a vehicle, the system comprising:

a display;

a memory storing instructions; and a processor executing the instructions to perform a process including:

generating and displaying a checklist GUI with a plurality of tasks on the display, the checklist GUI corresponding to a non-standard operating conditions checklist or a non-standard complex conditions checklist;

determining whether a user or a system indicated that a task of the plurality of tasks is complete;

in response to determining that the user indicated that the task is complete, updating the checklist GUI to change a status indicator of the task to a first type of status indicator; and in response to determining that the system indicated that the task is complete, updating the checklist GUI to change the status indicator of the task to a second type of status indicator.

9. The system of claim 8, wherein the checklist GUI includes status indicators associated with the plurality of tasks, and the status indicators are selected from among:

an incomplete task indicator, an ignored task indicator, a partially complete task indicator, a user completed indicator, and a system completed indicator.

10. The system of claim 8, wherein, when the checklist GUI corresponds to the non-standard operating conditions checklist, the checklist GUI includes a branching checklist and one or more sub-sections, the branching checklist is displayed as a circle with lines to each of the one or more sub-sections, and the one or more sub-sections are selectable by a user input to display a sub-section pop-up.

11. The system of claim 10, wherein the branching checklist is displayed as a completed branching checklist when a completed condition is triggered, the completed condition is triggered when at least one sub-section of the one or more sub-sections are complete, when all sub-sections of the one or more sub-sections are complete, or any combination thereof based on hierarchical layers.

12. The system of claim 8, wherein, when the checklist GUI corresponds to the non-standard complex conditions, the checklist GUI includes a complex procedure section, the complex procedure section includes a determination flow that includes an immediate action icon, a procedure section, a phase-of-flight icon, and/or a selection menu icon, the procedure section includes a system limitations icon, a root cause icon, a tasks icon, and/or a condition resolution icon, and the immediate action icon, the system limitations icon, the root cause icon, the tasks icon, and the condition resolution icon of the procedure section, and the phase-of-flight icon are selectable by a user input to access content related to icons, respectively, and/or input data.

13. The system of claim 12, wherein the immediate action icon, when selected by a user input, causes a menu to display one or more tasks that are to be completed immediately, the system limitations icon, when selected by a user input, causes a menu to display aircraft systems, a current status for each of the aircraft systems, and/or limitations, if any, for each of the aircraft systems, for a selection of aircraft systems to perform actions associated with the aircraft systems or to make changes to the limitations for each of the aircraft systems, the root cause icon, when selected by a user input, causes a menu to display potential causes of a situation, for a selection of a root cause, and the condition resolution icon, when selected by a user input, causes a menu to display decision sections, the decision sections display a form with one or more fields to input data.

14. The system of claim 13, wherein the process further includes:

as a user progresses through the complex procedure section, obtaining user inputs, systems limitations, a selected root cause, a phase-of-flight variable, a completed form, and/or completed tasks; and based on the user inputs, the systems limitations, the selected root cause, the phase-of-flight variable, the completed form, and/or the completed tasks, generating or selecting a checklist to resolve a situation.

15. A non-transitory computer-readable medium storing instructions that, when executed by a processor, cause the processor to perform a method for updating a graphic user interface (GUI) of a vehicle, the method comprising:

generating and displaying a checklist GUI with a plurality of tasks on a display, the checklist GUI corresponding to a non-standard operating conditions checklist or a non-standard complex conditions checklist;

determining whether a user or a system indicated that a task of the plurality of tasks is complete;

in response to determining that the user indicated that the task is complete, updating the checklist GUI to change a status indicator of the task to a first type of status indicator; and in response to determining that the system indicated that the task is complete, updating the checklist GUI to change the status indicator of the task to a second type of status indicator.

16. The non-transitory computer-readable medium of claim 15, wherein, when the checklist GUI corresponds to the non-standard operating conditions checklist, the checklist GUI includes a branching checklist and one or more sub-sections, the branching checklist is displayed as a circle with lines to each of the one or more sub-sections, and the one or more sub-sections are selectable by a user input to display a sub-section pop-up.

17. The non-transitory computer-readable medium of claim 16, wherein the branching checklist is displayed as a completed branching checklist when a completed condition is triggered, the completed condition is triggered when at least one sub-section of the one or more sub-sections are complete, when all sub-sections of the one or more sub-sections are complete, or any combination thereof based on hierarchical layers.

18. The non-transitory computer-readable medium of claim 15, wherein, when the checklist GUI corresponds to the non-standard complex conditions, the checklist GUI includes a complex procedure section, the complex procedure section includes a determination flow that includes an immediate action icon, a procedure section, a phase-of-flight icon, and/or a selection menu icon, the procedure section includes a system limitations icon, a root cause icon, a tasks icon, and/or a condition resolution icon, and the immediate action icon, the system limitations icon, the root cause icon, the tasks icon, and the condition resolution icon of the procedure section, and the phase-of-flight icon are selectable by a user input to access content related to icons, respectively, and/or input data.

19. The non-transitory computer-readable medium of claim 18, wherein the immediate action icon, when selected by a user input, causes a menu to display one or more tasks that are to be completed immediately, the system limitations icon, when selected by a user input, causes a menu to display aircraft systems, a current status for each of the aircraft systems, and/or limitations, if any, for each of the aircraft systems, for a selection of aircraft systems to perform actions associated with the aircraft systems or to make changes to the limitations for each of the aircraft systems, the root cause icon, when selected by a user input, causes a menu to display potential causes of a situation, for a selection of a root cause, and the condition resolution icon, when selected by a user input, causes a menu to display decision sections, the decision sections display a form with one or more fields to input data.

20. The non-transitory computer-readable medium of claim 19, further comprising:

as a user progresses through the complex procedure section, obtaining user inputs, systems limitations, a selected root cause, a phase-of-flight variable, a completed form, and/or completed tasks; and based on the user inputs, the systems limitations, the selected root cause, the phase-of-flight variable, the completed form, and/or the completed tasks, generating or selecting a checklist to resolve a situation.

\* \* \* \* \*